United States Patent
Cootey

(10) Patent No.: US 9,609,560 B2
(45) Date of Patent: Mar. 28, 2017

(54) CYBER FORAGING NETWORK SYSTEM FOR AUTOMATIC WIRELESS NETWORK ACCESS POINT DETECTION AND CONNECTION

(71) Applicant: Forager Networks, Inc., Newburyport, MA (US)

(72) Inventor: Philip Cootey, Newburyport, MA (US)

(73) Assignee: Forager Networks, Inc., Newburyport, MA (US)

( * ) Notice: Subject to any disclaimer, the term of this patent is extended or adjusted under 35 U.S.C. 154(b) by 6 days.

(21) Appl. No.: 14/443,950

(22) PCT Filed: Jan. 17, 2014

(86) PCT No.: PCT/US2014/011989
§ 371 (c)(1),
(2) Date: May 19, 2015

(87) PCT Pub. No.: WO2014/113637
PCT Pub. Date: Jul. 24, 2014

(65) Prior Publication Data
US 2015/0304920 A1    Oct. 22, 2015

Related U.S. Application Data

(60) Provisional application No. 61/754,255, filed on Jan. 18, 2013.

(51) Int. Cl.
*H04W 36/08*    (2009.01)
*H04W 28/18*    (2009.01)
*H04W 48/20*    (2009.01)
*H04W 72/08*    (2009.01)

(52) U.S. Cl.
CPC ........... *H04W 36/08* (2013.01); *H04W 28/18* (2013.01); *H04W 48/20* (2013.01); *H04W 72/085* (2013.01)

(58) Field of Classification Search
CPC ... H04W 76/043; H04W 36/08; H04W 48/20; H04W 28/18; H04W 72/085; H04W 64/006; H04W 8/02; G01C 21/26; G01C 21/32
USPC ...... 455/436, 404.1; 370/329; 701/409, 468; 705/26.61
See application file for complete search history.

(56) References Cited

U.S. PATENT DOCUMENTS

| | | |
|---|---|---|
| 6,285,883 B1 | 9/2001 | Bringby et al. |
| 6,980,816 B2 | 12/2005 | Rohles et al. |
| 8,000,276 B2 | 8/2011 | Scherzer et al. |
| 8,005,952 B2 | 8/2011 | Kammer et al. |
| 8,194,589 B2 | 6/2012 | Wynn et al. |
| 2002/0059453 A1 | 5/2002 | Eriksson et al. |
| 2007/0087756 A1 | 4/2007 | Hoffberg |
| 2007/0167182 A1 | 7/2007 | Tenhunen et al. |

(Continued)

OTHER PUBLICATIONS

International Search Report for International Application PCT/US2014/11989, dated Jul. 17, 2014.

*Primary Examiner* — Phuoc H Doan
(74) *Attorney, Agent, or Firm* — Sean D. Detweiler, Esq.; Morse, Barnes-Brown & Pendleton, P.C.

(57) ABSTRACT

A cyber-foraging network system which automatically and intelligently detects, selects, and connects to a wireless networking access point utilizing data obtained from its own environmental observations as well as from a robust wireless networking context aggregation/interpolation service.

26 Claims, 25 Drawing Sheets

(56) References Cited

U.S. PATENT DOCUMENTS

| | | |
|---|---|---|
| 2007/0224989 A1 | 9/2007 | Soong et al. |
| 2008/0076432 A1 | 3/2008 | Senarath et al. |
| 2011/0201336 A1* | 8/2011 | Garrett .............. H04W 36/0066 455/436 |
| 2013/0317944 A1* | 11/2013 | Huang .................. G01S 5/0252 705/26.61 |

* cited by examiner

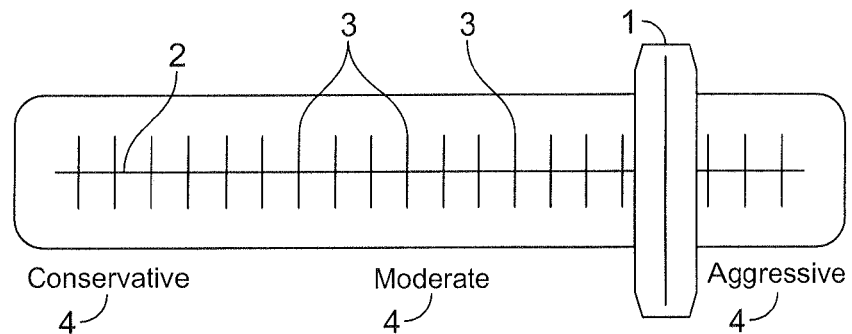
FIG. 8
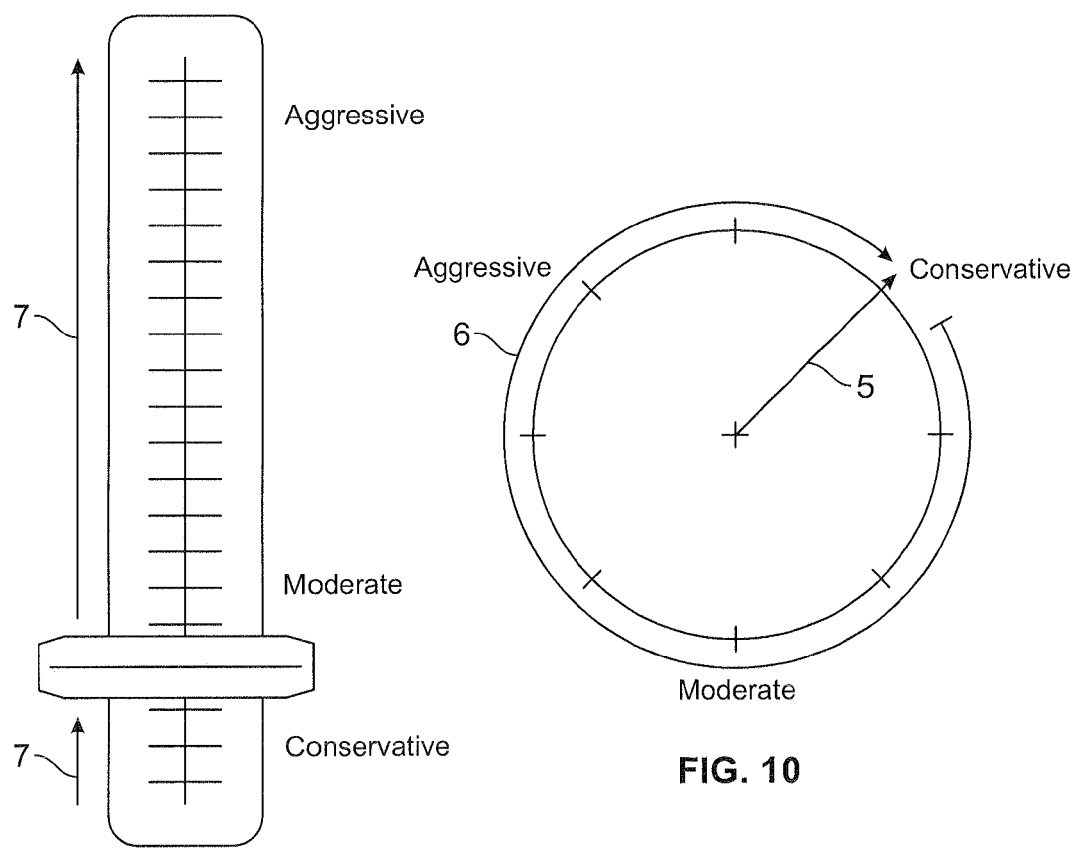
FIG. 9
FIG. 10

CYBER FORAGING NETWORK SYSTEM FOR AUTOMATIC WIRELESS NETWORK ACCESS POINT DETECTION AND CONNECTION

RELATED APPLICATIONS

This application is a national stage filing under 35 U.S.C. 371 of International Application No. PCT/US2014/11989, filed Jan. 17, 2014, which claims priority to, and the benefit of, U.S. Provisional Application No. 61/754,255, filed Jan. 18, 2013, the teachings of which are hereby incorporated by reference in their entirety. International Application No. PCT/US2014/11989 was published under PCT Article 21(2) in English.

FIELD OF THE INVENTION

The present invention relates to the technical field of network systems, and more particularly to a cyber-foraging network system and distributed control plane architecture for automatic wireless network access point detection and connection.

BACKGROUND OF THE INVENTION

Technology exists relating to contextual information management and hysteresis particularly in wireless communication devices (i.e., mobile devices). In one example, a wireless communication network and mobile wireless communication device receives contextual information which is unavailable in certain regions. In particular, these regional discontinuities may result from environments being populated only partially with contextual information sources or due to temporary interruptions. However, this example ignores the actual wireless networking context surrounding the mobile device or portable device (e.g., smartphone, tablet, or personal digital assistant).

In addition, technology exists relating to the process and systems for intelligently selecting wireless access points. One example is a Bluetooth® network including a method and system for selecting and connecting to an access point in a wireless network of devices. This example uses an initiator device that compares access point addresses for respondents with preconfigured access point addresses and connects to a match. However, this example focuses exclusively on preconfigured lists of access points for mobile devices.

In addition, there is technology providing easy access to radio networks. In one example, connectivity to radio access points is enabled by a service which includes a database storing data about different radio access points as well as an evaluation module that evaluates the quality of a connection to each radio access point. Clients receive information about the access points from the service, such as an external server, and use this information to connect to an access point. However, this example ignores a database of access points or a packet of data describing the network.

Also, there is technology related to conventional systems and methods for wireless network selection based on attributes stored in a network database. For example, a system receives a network identifier associated with a wireless network. Then, the system determines if a network profile associated with the network identifier is stored within a network profile database that includes network profiles. If the network profile associated with the network identifier is not stored within the database, a network profile is initiated and an attribute is associated with this network device identifier. However, this example focuses on only identifying both the physical location and characteristics of the wireless networks.

SUMMARY

There is a need for a system that can exceed the abilities of the current conventional technology in several capacities. The present invention is directed toward further solutions to address this need, in addition to having other desirable characteristics.

Some of these capacities include:

Automatic upload of detected wireless network information to a centralized database versus manual "tagging" and uploading.

Automatic continuous construction of dynamic wireless networking context versus static wireless network access point lists.

Automatic selection of optimal wireless network access points via complex, multi-faceted algorithms versus selection based solely on geophysical proximity and/or signal strength.

Automatic connection to optimal wireless network access points via complex, multi-faceted algorithms versus connection based solely on geophysical proximity and/or signal strength.

A prediction surface can be constructed on the mobile device from the wireless network context (e.g., radar system) giving the mobile device range beyond its own sensors.

Dynamic calibration of algorithms, including but not limited to functions, factors, limits, and thresholds, for wireless network access point detection, selection, and connection via simple, intuitive controls versus configuration screens full of options.

Presentation of in-context wireless network signal strength dynamically in real-time versus wireless network access points presented as static "pins on a map."

Augmentation of the characteristics of wireless networks commonly available in the management of wireless networks with additional context from sensors and other characteristics of mobile devices and communities of mobile device users.

There is no special hardware or configuration required for mobile devices beyond installation of the cyber-foraging client application and configuration of a consumer information profile in a Wi-Fi Marketplace subsystem.

There is no special hardware or configuration required for wireless networking hardware beyond configuration of a wireless network provider information profile in the Wi-Fi Marketplace subsystem. The Wi-Fi Marketplace subsystem incorporates principles from trading systems (e.g., consumers or users of mobile devices set a bid price, wireless network providers of the wireless access points provide asking price, and the subsystem negotiates the spread price).

Aspects of the present invention are dictated by characteristics of network architecture, in particular 802.11 wireless networking protocols.

More particularly, the present invention is in the field of cyber-foraging—a pervasive computing technique where resource-poor mobile devices offload heavy work to stronger distributed systems. Additionally, the present invention is in the field of crowd sourcing; the present invention relates to an outsourcing technique where a single person offloads work to one or more people.

The present invention is in the technical field of signal analysis. More specifically, the present invention is concerned with pervasive signal analysis. Furthermore the present invention is concerned with pervasive signal analysis of wireless network types and is not restricted to any wireless network type. Furthermore, the present invention applies to Wi-Fi signal analysis; this is a technique involving the interpretation of Wi-Fi signal, a set of radio transmissions generated by wireless networks and their wireless network access points, where the access points are detectable by the mobile device. Wi-Fi is defined in accordance with convention as radio waves used within a wireless local area network (WLAN), presently based on the IEEE 802.11 standard (e.g. 802.11b, 802.11g, 802.11n, etc.) and IEEE 802.22 (i.e., super Wi-Fi). Wi-Fi includes other current or future variations, standards, and versions of Wi-Fi-type signals being used with WLAN as appreciated by one of skill in the art. The subset of Wi-Fi signal both surrounding a mobile device and utilized by the mobile device is referred to as available Wi-Fi signal. The subset of Wi-Fi signal surrounding a mobile device, while also not utilized by the mobile device, is referred to as unavailable Wi-Fi signal. A captive portal is an example of unavailable Wi-Fi signal; captive portals force a mobile device to display a special web page—typically for authentication purposes—prior to accessing the Internet. In one example, captive portal credentials can be automatically submitted, creating a captive portal available Wi-Fi signal.

The present invention is in the technical field of geospatial statistics. More specifically, the present invention is concerned with multivariate interpolation such as inverse distance weighting—a type of deterministic method for multivariate interpolation, with a known scattered set of data points. The present invention relates to using the product of such interpolation as a prediction surface to predict signal strengths at locations on a surface map.

The present invention involves handoff techniques found in cellular communication, including hard handoff, where an existing network connection is broken prior to activation of a new network connection, and soft handoff, where no network connection exists prior to activation of a new network connection. Other aspects of the present invention involve signal averaging to remove fluctuations in aggregated signal data. Further aspects incorporate measurements to obtain the relative signal strength of the candidate signal for handoff. These aspects include calculating the handoff thresholds prohibiting handoff if the current signal is sufficiently weak. The present invention's aspects involve calculating hysteresis to reduce the Ping-Pong effect, while bouncing back and forth between candidate signals of equal strength. In addition, some aspects of the present invention integrate signal prediction to determine what candidate signal will be a better candidate reducing unnecessary handoffs. Other aspects of the present invention take into account velocity, heading, and altitude of the mobile device in consideration of the optimal access point to connect to or hold.

Wi-Fi signal access imposes limitations on users who cyber-forage with mobile devices; the present invention addresses these limitations. Mobile devices typically require users to manually review and select from a list of detected wireless networks, in order to access network-based services. Embodiments of wireless networks include, but are not limited to, any wireless networking access point, router, switch, repeater, or extender designed to accept and/or broker network transmissions from a mobile device to a distributed service. Manually detecting, selecting, and connecting to wireless networks requires users to shift attention from their current task, interfering with the very premise of pervasive computing.

Additionally, a common user experience is to discover upon connection to a seemingly-available wireless network that the connection cannot be utilized, without providing an access code or security key, for example, captive portal. Oftentimes this information is not available to the user—thus effectuating an unavailable Wi-Fi signal.

The difficulties of wireless network detection, selection, and connection are compounded when several wireless networks are available for connection. Furthermore, wireless network availability-related and latency-related characteristics such as signal strength, transmission speed, data throughput, and availability are in a constant state of flux based on physical factors such as air temperature, humidity, electromagnetic field (EMF) interference, distance, wind and weather, and the presence of objects such as trees, walls, hills, buildings, and similar structures. Additionally, wireless network availability-related and latency-related characteristics are affected by temporal factors such as a facility's hours of operation, short-term utilization patterns (e.g., daytime vs. nighttime activity pattern), and long-term utilization patterns (e.g., a bimodal academic school year activity pattern). Without historical context, it is unlikely that an unaided mobile device can select the right network in a saturated wireless environment.

Finally, the current state of the art typically embodies the physical location of wireless network access points as a static view, involving "pins on a map". The present invention relies on a more accurate, real-time representation of the available Wi-Fi signals. While a static presentation can be viewed as informational, its accuracy—and therefore its usefulness—is limited.

The present invention embodies the processes of automatic, efficient, and continuous wireless network detection, selection, connection, and visualization via a mobile device. These processes can be self-operating automata and are identified as part of the cyber-foraging network system. This cyber-foraging network system can include both the cyber-foraging client application and wireless networking context service, as well as their components.

This cyber-foraging network system detects available wireless networks and constructs a detailed collection of environmental observations representing a set of detected wireless networks. This collection of environmental observations is identified as the wireless networking context of the mobile device (i.e., context is collected by the mobile device). Wireless networking context is not restricted to wireless characteristics of the network to which the mobile device is connected but also includes characteristics collected by the sensors of the mobile device, media data made available by the mobile device user, and including but not limited to characteristics of the mobile device itself such as operating system type, version, type of phone, etc. The construction process is identified as wireless networking context construction (i.e., construction of context) and the wireless networking context constructor is the embodiment of this construction process. The mobile device uploads the constructed context to the cyber-foraging network system. The context is aggregated and stored.

This cyber-foraging network system dynamically constructs the set of functions, ranges, and thresholds which govern the processes of wireless network detection, selection, and connection for transfer to the mobile device. This set of functions, ranges, and thresholds is identified as the cyber-foraging network system configuration set (e.g., calibration set). The present invention relates to routing and in particular software-defined networking by decoupling the control plane from the firmware of routers and switches and moving aspects of the control plane to the mobile device itself. The calibration process is identified as dynamic system calibration and the dynamic system calibrator is one embodiment of this calibration process. The dynamic system calibrator will utilize the cyber-foraging network system configuration set to recalibrate a cyber-foraging client application (i.e., automaton) affecting all aspects of detecting, selecting, and connecting to the optimal access point. Dynamic system calibration improves on conventional control plane components of distributed telecommunications architecture by serving the data plane on the mobile device. By request, interpolation can occur generating interpolated data that can be deduced to form the cyber-foraging network system configuration set which is sent to the mobile device. Further optimizations can cache the interpolation.

The mobile device, affected by the calibration, uses the cyber-foraging network system to select an optimal wireless networking access point from the set of wireless networks in range of the mobile device. The optimal wireless networking access point is identified as the wireless networking handoff candidate. The selection process is identified as wireless networking handoff candidate selection and the wireless networking handoff candidate selector is one embodiment of this selection process.

The mobile device, affected by the calibration, uses the cyber-foraging network system to process the wireless networking context to identify the wireless networking handoff candidate and then determine the moment in time to connect to that candidate. The point in time where a connection is initiated to the wireless networking handoff candidate is identified as the wireless networking handoff point. The handoff process is identified as the adaptable handoff strategy and the adaptable handoff strategy processor is one embodiment of this determination process.

The cyber-foraging network system presents the wireless networking context of the mobile device to the user. This visualization of the wireless networking context is identified as the wireless networking context map (i.e., local prediction service). It is a combined view of wireless context collected locally combined with the interpolated context downloaded from the system. The map creation process is identified as wireless networking context map generation and the wireless networking context map generator is one embodiment of this compilation process. The wireless networking context map has further utility on the device as a local prediction surface upon which more optimal selections for connection can be made.

In accordance with an embodiment of the present invention, a network system includes wireless access points at a particular location or region. The network system can include a mobile wireless networking subsystem device having a cyber-foraging client application configured to collect environmental information data from the particular location or region including from the wireless access points. The network system can further include a wireless networking context service subsystem in communication with the mobile wireless networking subsystem device. The wireless networking context service subsystem can receive the environmental information data from the mobile wireless networking subsystem device. The wireless networking context service subsystem has a networking context aggregation module and a networking context interpolation module. These modules are operable to determine an optimal wireless access point for continuous connection with the mobile wireless networking subsystem based on the environmental information data. The network system has a controller configured to direct the mobile wireless networking subsystem to connect with the optimal wireless access point.

In accordance with aspects of the present invention, the environmental information data includes weather data. In one aspect, the environmental information data includes traffic/commute-related data. In one aspect, the environmental information data includes social interaction data. In one aspect, the environmental information data includes network utilization data. In one aspect, the environmental information data includes cost of using each wireless access point. In one aspect, the environmental information data includes metrics derived through application of one or more processing algorithms. In one aspect, the environmental information data includes detection, selection, and connection together forming an orthogonal state machine.

In accordance with aspects of the present invention, the determination of optimal for the wireless access point is based on a quality of service (QoS) and a user preferred calibration. In one aspect, the determination of optimal for the wireless access point is based on a network preferred calibration. In one aspect, the determination of optimal further comprises native physical and temporal factors. These factors can include heading, geospatial velocity, security, security credentials, channel crowding, signal strength, signal strength relative to averaging window, prediction, suggestion, preferred networks, and upload/download velocity.

In accordance with aspects of the present invention, the aggregation module combines the environmental information data to form aggregated data.

In accordance with aspects of the present invention, the network system can include a Wi-Fi marketplace subsystem configured to register the plurality of wireless access points creating registered wireless access points that are configured to securely connect with the mobile wireless networking subsystem. In one aspect, the Wi-Fi marketplace subsystem is configured to collect security credentials from the registered wireless access points. The Wi-Fi marketplace subsystem can be configured to allow each of the registered wireless access points to set an asking price for connection and allow the mobile wireless networking subsystem to set a bid price for connection. The Wi-Fi marketplace subsystem can be configured to set a negotiated price based on a difference between the asking price and the bid price. In one aspect, the Wi-Fi marketplace subsystem can include a wireless network policy module having a policy controller in communication with the mobile wireless networking subsystem and a policy configuration in communication with the registered wireless access points. The policy controller can be configured to provide one or more functional aspects of a control plane.

In accordance with aspects of the present invention, the wireless networking context service subsystem can include a wireless network policy module that has a policy controller configured to provide one or more functional aspects of a control plane. The wireless network policy module can be in communication with the networking context interpolation module. In one aspect, the network system can include a policy controller configured to provide one or more functional aspects of a control plane. In one aspect, the network system can include a policy controller having a control plane.

In accordance with an embodiment of the present invention, a method of selecting an optimal wireless access point includes communicating with wireless access points at a particular location or region. Environmental information data, from the particular location or region including from the wireless access points, is collected. The environmental information data is aggregated for the wireless access points to produce aggregated data. The aggregated data is interpolated to produce interpolated data. The optimal wireless access point is selected based on the interpolated data. Communication occurs with the optimal wireless access point. In one aspect, the interpolated data can be calibrated prior to selecting the optimal wireless access point.

In accordance with aspects of the present invention, the optimal wireless access point is selected based on a quality of service (QoS) and a specified calibration. In one aspect, the selection of the optimal wireless access point can include native physical and temporal factors. These factors can include heading, geospatial velocity, security, security credentials, channel crowding, signal strength, signal strength relative to averaging window, prediction, suggestion, preferred networks, and upload/download velocity.

In accordance with aspects of the present invention, a quality of a signal is weighted from the wireless access points for selecting the optimal wireless access point.

In accordance with aspects of the present invention, the environmental information data includes a cost of using each wireless access point. In a further embodiment, the optimal wireless access point is selected based on a user's maximum set cost for the wireless access points.

In accordance with aspects of the present invention, the wireless access points are registered by uploading secured credentials from each wireless access point before communicating with the optimal wireless access point.

In accordance with an embodiment of the present invention, a mobile device includes a cyber-foraging client application configured to collect environmental information data from wireless access points. The cyber-foraging client application sends the environmental information data to an external service for determining an optimal wireless access point based on the environmental information data. The mobile device can include a controller for directing the mobile device to connect to the optimal wireless access point.

In accordance with aspects of the present invention, the cyber-foraging client application includes an adaptable handoff strategy processor configured to receive interpolated data from the external service for determining an adaptable handoff strategy. In a further embodiment, the adaptable handoff strategy processor considers a connected velocity and/or a connected strength based on the received interpolated data for determining the adaptable handoff strategy. In a further embodiment, the adaptable handoff strategy processor considers calibration through functions embedded on the cyber-foraging client application and functions interpolated by the external service for determining the adaptable handoff strategy. In one aspect, the adaptable handoff strategy processor is configured to identify a wireless networking handoff point in time and place that is the optimal wireless access point.

In accordance with aspects of the present invention, the cyber-foraging client application includes a wireless networking context constructor. In a further embodiment, the wireless networking context constructor builds a wireless networking context and sends the wireless networking context to the external service for aggregation. In a further embodiment, the wireless networking context constructor receives interpolated data from the external service and the wireless networking context constructor stores the interpolated data and the wireless networking context.

In accordance with aspects of the present invention, the cyber-foraging client application includes a network handoff candidate selector. In a further embodiment, the network handoff candidate selector selects the optimal wireless access point based on the optimal wireless access point signal while considering native physical and temporal factors. In a further embodiment, the native physical and temporal factors can include heading, geospatial velocity, security, channel crowding, signal strength, signal strength relative to averaging window, prediction, suggestion, and upload/download velocity.

In accordance with aspects of the present invention, the network handoff candidate selector can include a policy control agent configured for weighting factors for selecting the optimal wireless access point signal. In one aspect, the policy control agent can be configured to provide one or more functional aspects of a control plane.

In accordance with aspects of the present invention, the cyber-foraging client application includes a dynamic system calibrator configured to receive a cyber-foraging network system configuration set. In a further embodiment, the dynamic system calibrator intersects with connection, selection, and detection together forming an orthogonal state machine.

In accordance with aspects of the present invention, the cyber-foraging client application includes a wireless networking context map generator for presenting wireless network context visualization.

In accordance with aspects of the present invention, the cyber-foraging client application includes a scan manager.

In accordance with aspects of the present invention, the mobile device can include a policy control agent configured to provide one or more functional aspects of a control plane. In one aspect, the mobile device can include a policy control agent having a control plane.

In accordance with an embodiment of the present invention, a method of selecting an optimal wireless access point includes a mobile device operating a cyber-foraging client application for detecting wireless access points. The mobile device collects environmental information data from a particular location or region. A portion of the environmental information data is collected from the wireless access points. The mobile device sends environmental information data to at least one external service to determine an optimal wireless access point based on the environmental information data. The mobile device receives optimal wireless access point determination data from the at least one external service. The mobile device automatically selects the optimal wireless access point based on the determination data. The mobile device establishes communication with the optimal wireless access point.

In accordance with an embodiment of the present invention, a wireless networking context service (WNCS) is configured to receive, process, and serve requests on environmental information data related to wireless access points. The WNCS can include a WNCS aggregation module that combines the environmental information data into a common set of aggregate data that represents historical environmental information data for specific locations at specific dates and times. The WNCS can include a WNCS interpolation module that interpolates the set of aggregate data to create interpolated data. The WNCS can include a controlling module that determines an optimal wireless access point from an optimal wireless access point path based on the interpolated data.

In accordance with aspects of the present invention, the WNCS further includes a wireless networking context map generator for presenting wireless network context visualization.

In accordance with aspects of the present invention, the controlling module of the WNCS determines optimal for the wireless access point based on a quality of service (QoS) and a specified calibration. In one aspect, the controlling module's determination of optimal can include native physical and temporal factors including heading, geospatial velocity, security, security credentials, channel crowding, signal strength, signal strength relative to averaging window, prediction, suggestion, preferred networks, and upload/download velocity.

In accordance with aspects of the present invention, the WNCS aggregation module combines the environmental information data to form aggregated data.

In accordance with aspects of the present invention, the WNCS interpolation module interpolates the set of aggregate data to supply missing data In accordance with aspects of the present invention, the WNCS interpolation module can include a range and function interpolator enabling the controlling module to determine the optimal wireless access point in real time for the specific locations.

In accordance with aspects of the present invention, a method of selecting an optimal wireless access point based on environmental information data received from wireless access points includes aggregating the environmental information data to produce aggregate data that represents historical environmental information data for specific locations at specific dates and times. The aggregate data is interpolated to produce interpolated data. An optimal wireless access point is determined based on the interpolated data.

BRIEF DESCRIPTION OF TILE FIGURES

These and other characteristics of the present invention will be more fully understood by reference to the following detailed description in conjunction with the attached drawings, in which:

FIG. 8 is one embodiment of a singular control used for dynamic system calibration according to one aspect of the present invention;

FIG. 9 is one embodiment of a singular control used for dynamic system calibration according to one aspect of the present invention;

FIG. 10 is one embodiment of a singular control used for dynamic system calibration according to one aspect of the present invention;

DETAILED DESCRIPTION

Figure 1:
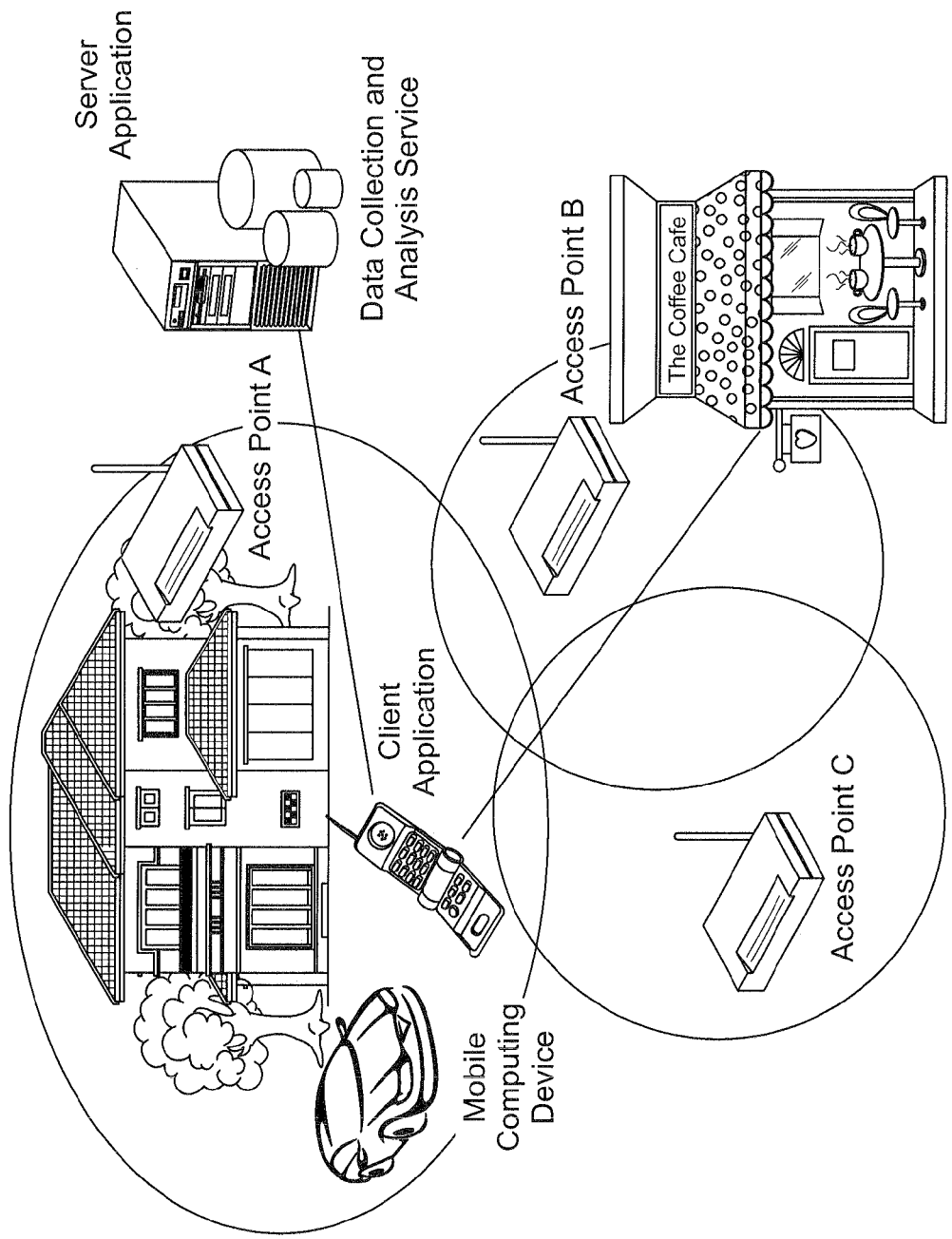
FIG. 1 is a network system having a cyber-foraging client application, wireless networking access points, and wireless networking context aggregation service according to an embodiment of the present invention.

The present invention embodies the processes of automatic, efficient, and continuous wireless network detection, selection, connection, and visualization via a mobile device. These processes are identified as part of the cyber-foraging network system. This cyber-foraging network system includes both the cyber-foraging client application and wireless networking context service, as well as their components.

The cyber-foraging network system can include a Wi-Fi Marketplace subsystem integrated into the cyber-foraging network system (i.e., creating market between wireless network providers and mobile device users). Alternatively, the Wi-Fi Marketplace can be a separate system from the cyber-foraging network system.

In one example, the cyber-foraging network system can include a convergent network manager (CNM) that provides a service of identifying and accessing convergent layers of all existing networks. In this example, a generated convergent network map can provide a real-time, crowd-sourced observation. For example, the convergent map can pinpoint an indoor device location to a distance (e.g., about 2.5 meters).

Where conventional systems are piecemeal requiring a mobile device to separately connect with a cellular carrier (that are at a capacity) or separately connect with a Wi-Fi network, the cyber-foraging network system provides a solution of seamless connectivity across multiple networks (e.g., multiple wireless access points providing multiple Wi-Fi networks). The cyber-foraging network system allows for identification and access to multiple networks (e.g., managed networks and unmanaged networks) and determining the optimal network (i.e., optimal wireless access point) to connect with for a given time and place. This allows for a mobile device using the cyber-foraging network system to connect to a seamless convergent network, delivering continuous connectivity. Thus, enabling the mobile device to provide automated network transitions between networks at the right time (e.g., specific dates and times) and place to an optimal network.

FIGS. 1 through 28, wherein like parts are designated by like reference numerals throughout, illustrate example embodiments of a cyber-foraging network system according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

Cyber-Foraging Network System

The present invention embodies the processes of automatic, efficient, and continuous wireless network detection, selection, connection, and visualization via a mobile device.

Figure 3:
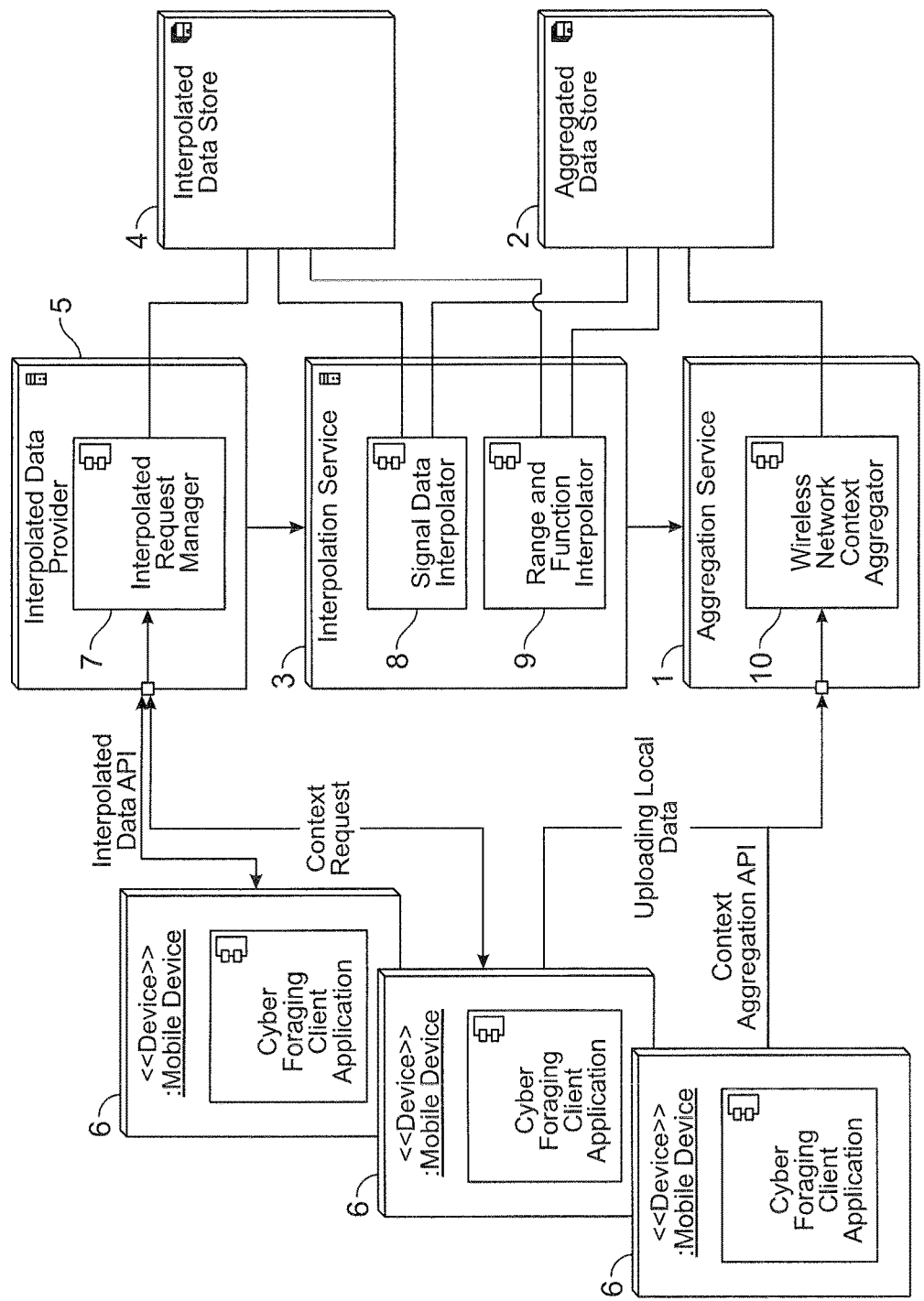
FIG. 3 is a network system including a cyber-foraging client application subsystem and wireless networking context (WNC) subsystem according to one aspect of the present invention.

As shown in FIG. 3, the cyber-foraging network system (CFNS) includes, but is not limited to, two main embodiments: a mobile wireless networking subsystem identified as the cyber-foraging client application (CFCA) 6 and a distributed data aggregation and interpolation subsystem 1, 2, 3, 4, 5 identified as the wireless networking context service (WNCS). These subsystems, as well as the processes they embody, are activated and driven by a cyber-foraging event model, enabling automatic, efficient, and continuous wireless network detection, selection, and connection for a mobile device.

Cyber-Foraging Client Application

The cyber-foraging client application (CFCA) subsystem 6 is installed on the physical disk of or otherwise resident in the physical memory of a mobile device. In one embodiment, the CFCA is a state machine comprised of process embodiments which respond to asynchronous events generated by sensors, as well as other event sources integrated with the mobile device.

Figure 4:
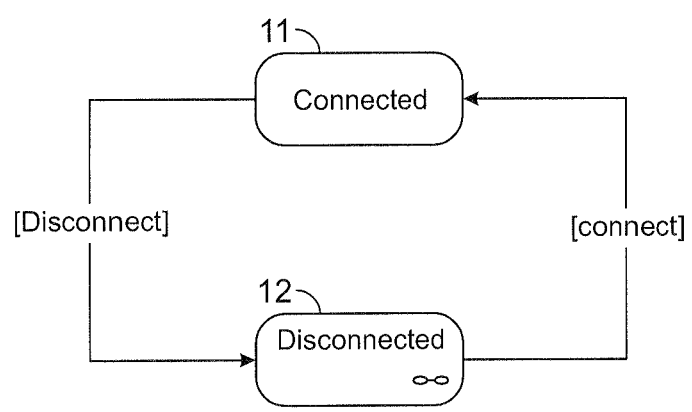
FIG. 4 illustrates two fundamental states of a cyber-foraging client application (CFCA) (i.e., automaton) according to one aspect of the present invention.

The CFCA state machine maintains at least two overall states during its lifecycle, as illustrated in FIG. 4:

Connected 11

Disconnected 12

Figure 5:
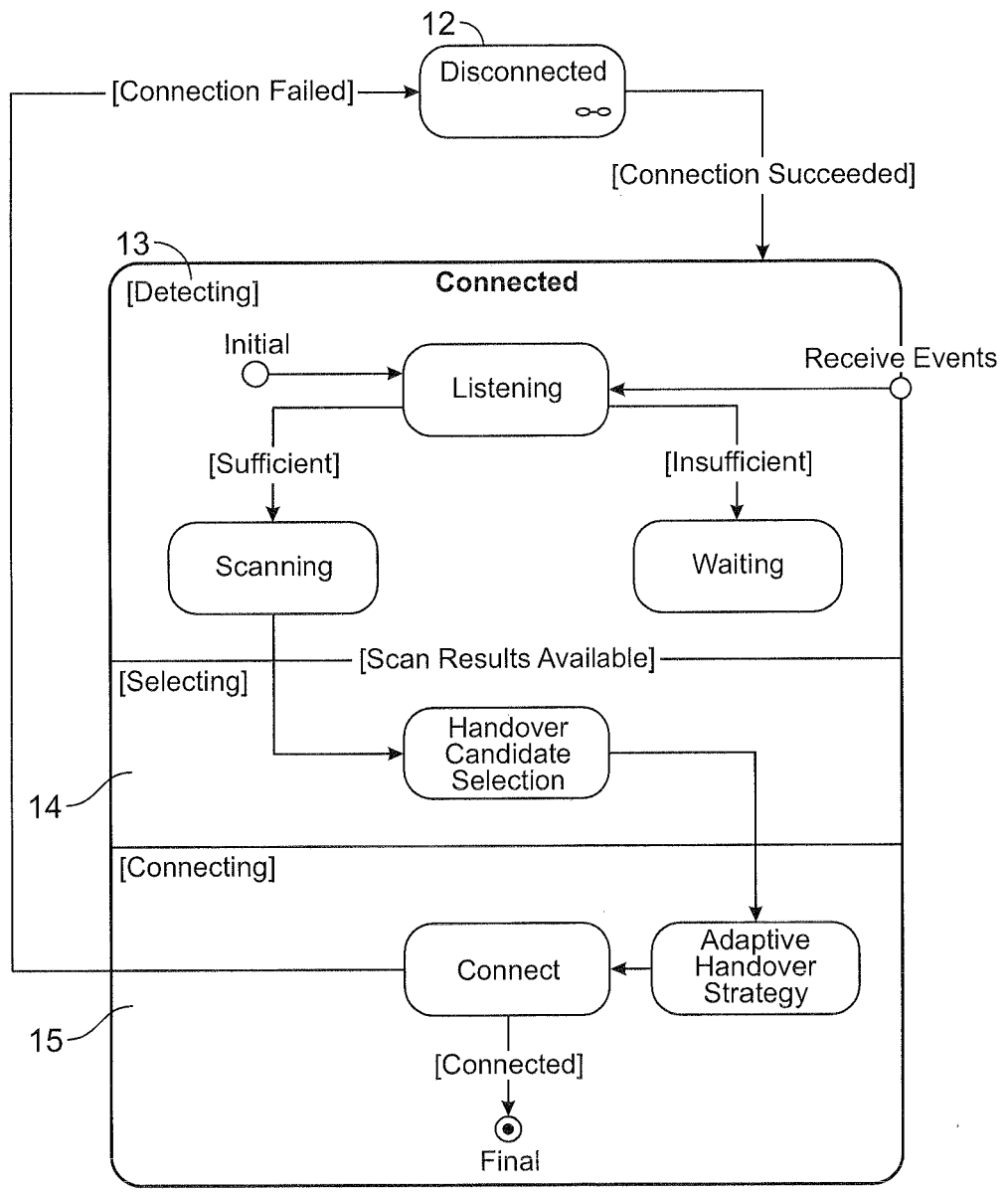
FIG. 5 is an orthogonal composite state machine with three levels of concurrency according to one aspect of the present invention.

In one embodiment, these Connected 11 and Disconnected 12 states are further comprised of orthogonal composite states, as illustrated in FIG. 5. These orthogonal composite states include, but are not limited to:

Detecting 13

Selecting 14

Connecting 15

Utilization of these orthogonal composite states ensures that processes interrupt neither the user of the mobile device or any other process running on the mobile device. The events from the cyber-foraging event model intersect these states.

Wireless Networking Context Service

The wireless networking context service (WNCS) subsystem 1, 2, 3, 4, 5 is installed on the physical disk of or otherwise resident in the physical memory of one or more distributed machines. The WNCS is a distributed service comprised of process embodiments responsible for enhancing the wireless networking context (WNC) constructed by the CFCA 6. The processes of enhancement (e.g., modules) include but are not limited to:

Wireless Networking Context Aggregation

Wireless Networking Context Interpolation

The enhanced wireless networking context returned to the CFCA by the WNCS is comprised of environmental observations collected from the CFCAs hosted on one or more mobile devices, as well as information obtained from third-party data sources and feeds integrated directly with the WNCS. For example, using the WNCS, a historical context can be collected from the mobile device to be used for determining an optimal wireless access point. This extra-sensory environmental information data includes, but is not limited to:

TABLE 1

EXTRA-SENSORY ENVIRONMENTAL INFORMATION DATA

Weather data
Traffic/commute-related data
Social interaction data
Network utilization data
Metrics derived through the application of one or more processing algorithms to these and other environmental observations and data points.
Geospatial Statistics such as velocity, heading, altitude, latitude, and longitude
Cost of using a wireless access point This information is extra-sensory environmental information data to emphasize the possibility that the data returned to the mobile device from the WNCS can reside outside of the reach or capabilities of its on-board sensors. Extra-sensory environmental information data is aggregated by the WNCS for use by the CFCA in making decisions regarding wireless detection, selection, connection, and visualization. In addition to aggregation of actual recorded observations, the WNCS interpolates values for geographic areas lacking data (i.e., WNCS can interpolate a set of aggregate data to supply missing data). Examples of the end products of these data aggregation and interpolation processes include, but are not limited to:

TABLE 2

PRODUCTS OF DATA AGGREGATION AND INTERPOLATION

Interpolated wireless network signal strength data matrices are
utilized by the wireless network context constructor 17.
Dynamically-calculated functions and ranges are utilized
by the adaptable handoff strategy processor 16.

The incorporation of these additional environmental observations into enhanced data sets and their incorporation into the processes of the CFCA as they extend the range of on-board sensors of a mobile device in the process of maintaining the best possible continuous connection by the WNCS is a feature of the cyber-foraging network system. In one example, environmental information (e.g., environmental observations) can include any data available from sensors of the mobile device as appreciated by one of skill in the art.

Dynamic System Calibration

In one example of the present invention, the cyber-foraging network system is responsible for dynamically constructing the set of functions, ranges, and thresholds which govern the processes of wireless network detection, selection, and connection. This set of functions, ranges, and thresholds is identified as the cyber-foraging network system configuration set (e.g., calibration set).

All mobile devices equipped with Wi-Fi radios feature a basic set of functions, ranges, and thresholds which govern the processes of wireless network detection, selection, and connection. In one example, the system presents configurable continuous connectivity algorithms and processes on the CFCA, specifically designed to maintain connectivity in both portable and mobile computing scenarios. These algorithms and processes are affected by the consumer of the available Wi-Fi through interaction with controls of the mobile device which initiate calibration activities on the mobile device and through replacement processes when connected and available. In one example, dynamic calibration of algorithms (e.g., functions, factors, limits, and thresholds) can occur for wireless network access point detection, selection, and connection via simple, intuitive controls versus configuration screens full of options.

Figure 7:
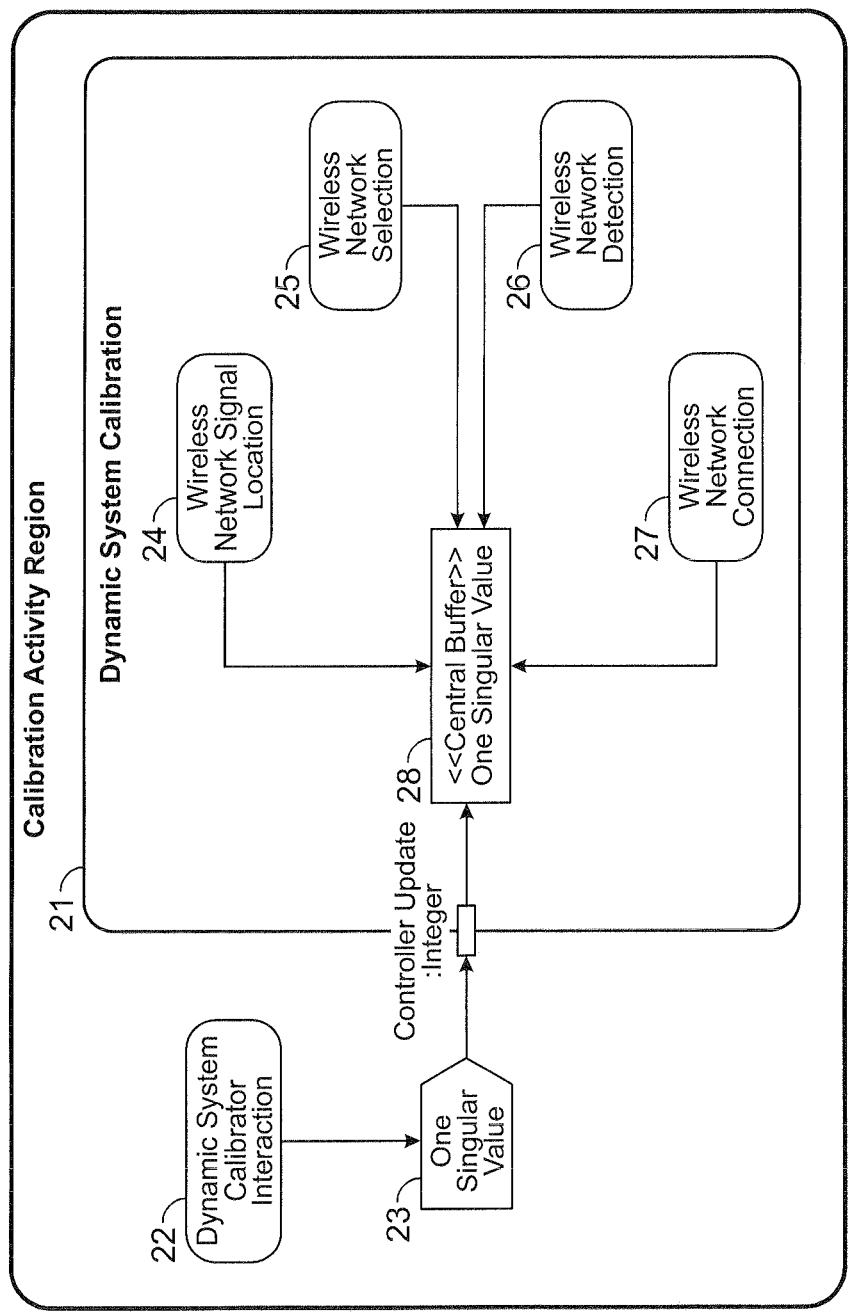
FIG. 7 illustrates the calibration activity of dynamic system calibration according to one aspect of the present invention.

The calibration activities on the CFCA used to enhance and extend the system capabilities to maintain continuous connectivity are identified as dynamic system calibration, as shown in FIG. 7. Referring to this diagram, the processes affected by these activities include but are not limited to wireless network detection 26, wireless network selection 25, wireless network connection 27, and wireless network signal location 24.

Figure 6:
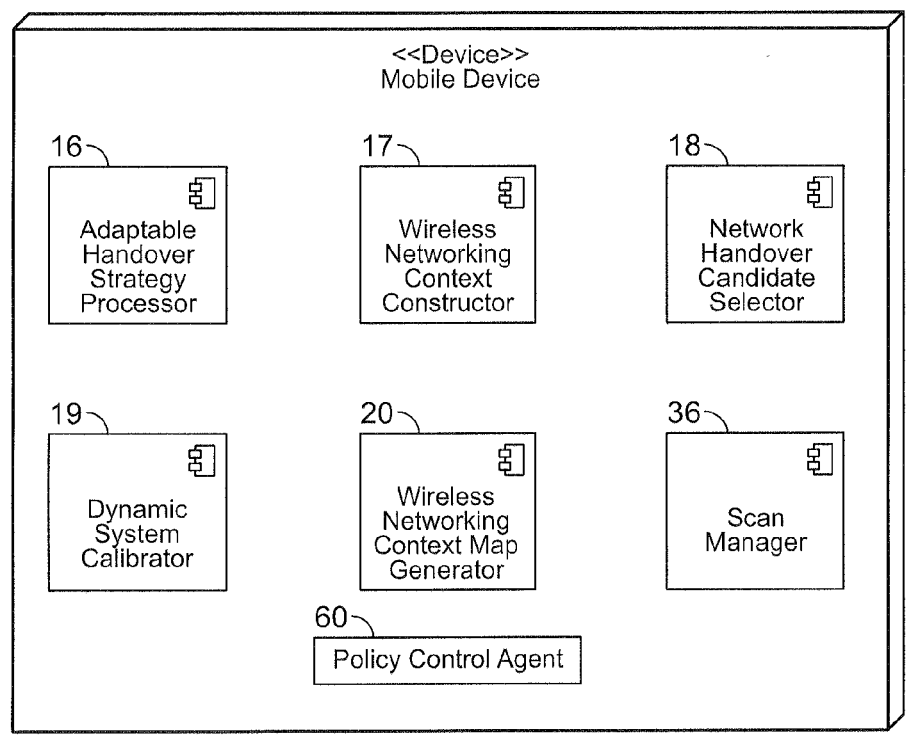
FIG. 6 is the component diagram of the cyber-foraging client application according to one aspect of the present invention.

In one embodiment of calibration, it is an activity initiated by the consumer of the available Wi-Fi through the CFCA using the dynamic system calibrator 19 in FIG. 6. This initiation is depicted in the activity diagram of FIG. 7 as the action of the Dynamic System Calibrator Interaction 22 triggering the event which identifies One Singular Value (OSV) 23, handled and stored by the Dynamic System Calibration 21, for availability to all the processes of the CFCA affected by calibration.

In one embodiment, the OSV is part of the cyber-foraging network system configuration set and there is no interaction with a controller at all since this set is dynamically constructed by the cyber-foraging network system.

Embodiments of this control can include, but are not limited to physical controls such as knobs or dials, as depicted in FIG. 10, or buttons, and virtual controls such as interactive images and slider bars, as depicted in FIGS. 8 and 9. Some controllers are designed for use with touch screen-based devices while other embodiments include physical controllers.

In one example, the OSV is identified by positioning the dynamic system calibrator control over one value of a series of continuous values. In another example, the OSV is delivered by the WNCS in the cyber-foraging network system configuration set according to what is appropriate for that location. In one embodiment, the breadth of dynamic system calibration, referred to as aggression level, is represented internally to the system as an OSV ranging from 0 to 1.

Examples of the products of functions, identified as thresholds, affected variably by ranges and OSV include, but are not limited to:

TABLE 3

PRODUCTS OF FUNCTIONS

S (scan interval), maximum allowable elapsed time between wireless
network scan requests
L (location interval), minimum allowable geospatial difference between
wireless network scan requests
LA (location accuracy), the allowable accuracy for location retrieval.
P (power level), minimum allowable power level for wireless network
detection, selection, and/or connection
Y (candidate threshold), minimum allowable wireless network signal
strength to be considered for handoff candidate selection
T (connected signal threshold), the minimum allowable wireless
network signal strength to allow before handoff candidate
replacement (hard handoff)
h (hysteresis), minimum allowable difference in signal strength between
the connected wireless network and the handoff candidate wireless
network to be considered for handoff
dMax/dMin (scan duration), the minimum and maximum
allowable amounts of elapsed time for scan requests Each process in FIG. 7 is initially populated with a set of default values for all pertinent functions, ranges, and thresholds. These default values are subsequently replaced by more accurate values derived in real-time by local observations recorded by the CFCA as well as aggregated and interpolated observations provided by the WNCS. The derivation and utilization of calculated values for the functions, ranges, and thresholds governing the processes embodied by the cyber-foraging network system and its components regulated by the dynamic system calibration control is a feature of the cyber-foraging network system.

The policy of the cyber-foraging network system can have an effect on what access point a mobile device can connect to. In one example, a cyber-foraging network system can use a CFCA to connect autonomously without the assistance of distributed systems. In another example, the cyber-foraging network system can calibrate how heavily channel crowding should be as a consideration in the selection process.

In particular, a policy control agent 60 (i.e. Cyber-Foraging Policy Agent (CFPA)) on the CFCA can weight the conditions (i.e., factors) a cyber-foraging network system may impose on clients (i.e., enabling selection of optimal wireless access point signal). The cyber-foraging network system can include a control plane that is manifested on the policy control agent 60 (i.e., CFPA). In conjunction with the policy control agent 60, the control plane provides calibration of the dynamic handoff. For example, the control plane acts as a decision tree assisting the cyber-foraging network system in identifying the best possible QoS based on the location of the mobile device. Thus, this provides distribution of the control plane.

In particular, the policy control agent 60 can be the control plane, as shown in FIG. 6, for the distribution of policy, which controls the control plane decision tree (i.e., distributed aspect of control plane). The control plane can provide a domain for any distributed software. For example, the cyber-foraging network system can build the cyber-foraging network system configuration set by interpolated aggregated data on the location which can impact the decisions of the policy control agent 60. The policy control agent 60 can be configured for network management with restrictions and policy to control factors for selecting the optimal wireless access point. In one example, a control plane using the policy control agent 60 can be on the mobile device. In an alternative example, certain aspects of the control plane can be on the mobile device via the policy control agent 60 and other aspects of the control plane can be on the wireless access point and/or other aspects of the control plane can be on other devices such as servers, routers, or switches (i.e., distributed control plane).

There are a number of examples of the control plane with the policy control agent 60 being utilized. In some examples, the policy control agent 60 can provide one or more functional aspects of a control plane. In one example, the policy control agent 60 as a control plane receives policy configuration from the WNCS. In another example, a policy configuration is delegated to a Policy Service API. In another example, the policy control agent 60 as a control plane stands alone on the mobile device and operates autonomously using default policy configurations. These policy conditions can include but are not restricted to Heading, Prediction, Suggested Candidate, Velocity, Signal Strength, Security, Channel Crowding, and Upload Download Speeds.

Figure 12:
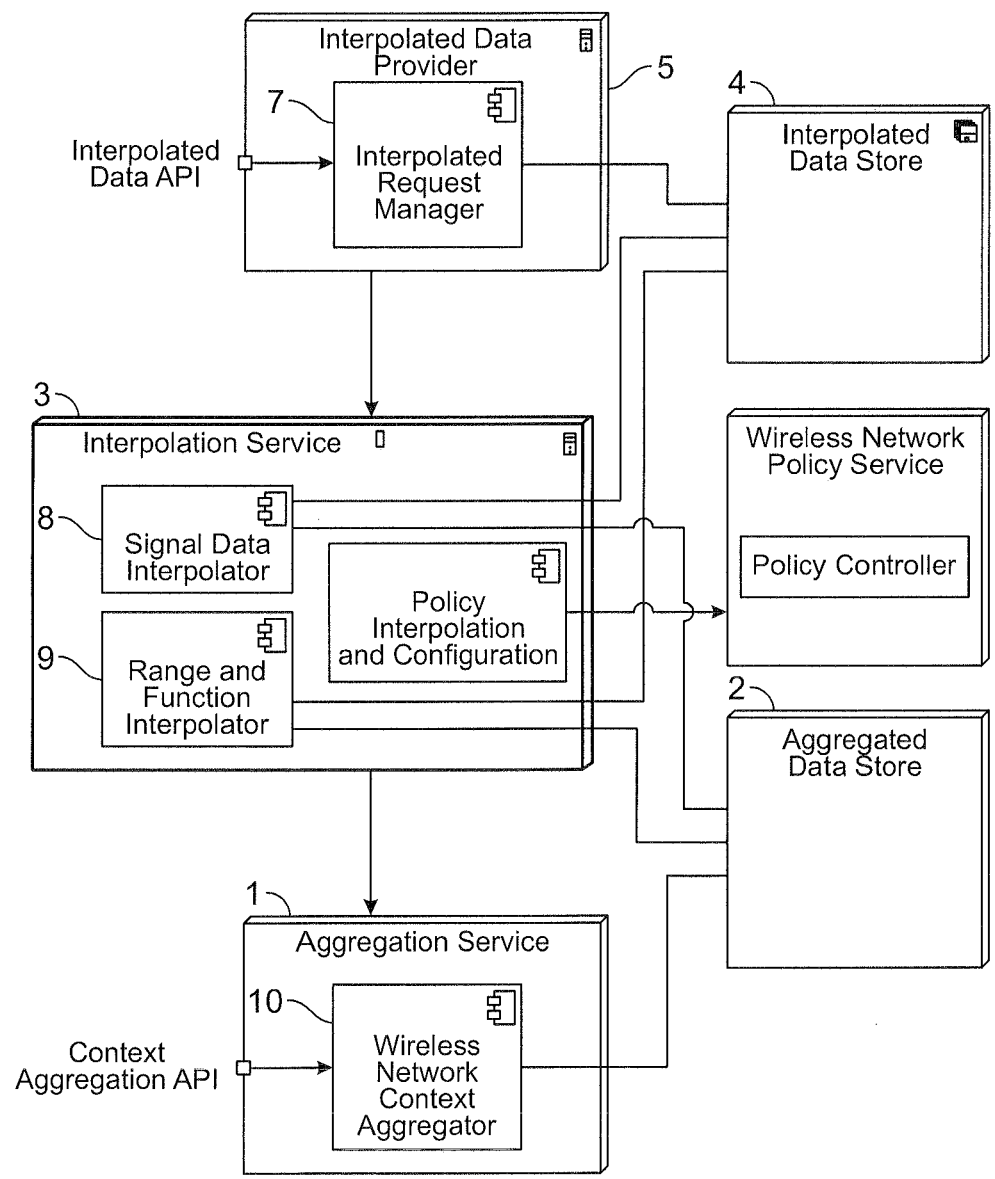
FIG. 12 is a wireless network context service according to one aspect of the present invention.

As described above, the policy control agent 60 is on the mobile device and a policy controller is on a wireless network policy service as shown in FIG. 12. In this example, other aspects of a control plane can function via the policy controller in the wireless network policy service. FIG. 12 illustrates a wireless network context service where the interpolation service 3 directs policy interpolation and configuration data or information to the policy controller of the wireless network policy service. The control plane aspects or the agent control plane of the policy control agent 60 are influenced by the cyber-foraging network system configuration set (e.g., calibration set) and the OSV. The cyber-foraging network system configuration set includes properties from the policy controller (shown in FIG. 12). In one example, the control plane of the policy controller can be influenced by a configuration of a wireless network provider combined with the interpolated context. The control plane of the policy controller communicates with the control plane (i.e., agent control plane) of the policy control agent 60 through the cyber-foraging network system configuration set.

Wireless Network Detection

In one example of the present invention, the cyber-foraging network system is responsible for detecting available wireless networks and constructing a detailed collection of environmental observations representing the set of detected wireless networks. This collection of environmental observations is identified as the wireless networking context of the mobile device. In another example, the detection of wireless networks is enhanced with interpolated data from surrounding areas received on request by the CFCA to the WNCS for calibration of the detection processes.

At a fundamental level, all mobile devices, equipped with Wi-Fi radios, are capable of detecting wireless networks within the range of their sensors. This basic process of wireless network detection is referred to as a wireless network scan. In one example, wireless network scan results are published by the operating system and observed by the CFCA, as shown in FIG. 6. In one example, the CFCA conserves power required for foraging for signal by observing the results of wireless network scans requested by other processes running on the mobile device, at 35 in FIG. 11, effectively foraging OS processes for the signal data, at 31 in FIG. 11. In another example, the CFCA can initiate its own scans, at 30 in FIG. 11. The completed scans trigger evaluations to identify candidates for connection even if the device is currently connected.

Wireless Network Scan Initiation

In one example embodiment of the present invention, the cyber-foraging network system improves upon existing technologies by extending beyond this basic process of wireless network detection through the determination of the optimal time to initiate a scan based on the observation of various characteristics of the mobile device and its surrounding environment. Examples of the problem are, but are not limited to, considerations of the level of power available to the CFCA to initiate a scan or if it is known there are no access points (APs). In one example, if the battery is too low then initiating a scan for a connection is pointless when there is not enough power to maintain a connection. In another example, if historically there is no AP in that area, where a dead zone has been identified; intermittent scans are performed per instruction from the WNCS. In another example, the wireless network context retrieved from the WNCS is out of date or sparse and needs to be updated.

Figure 11:
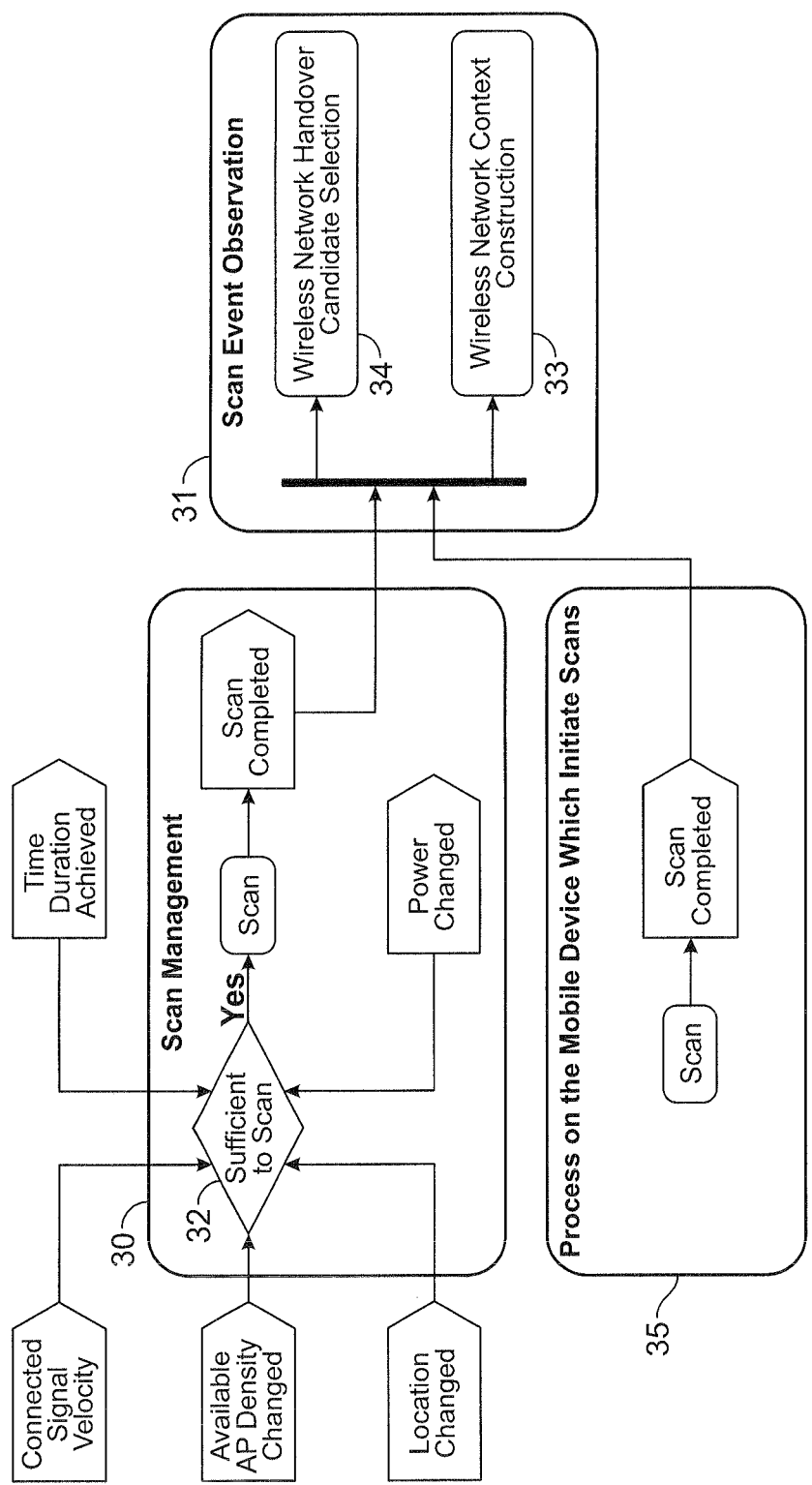
FIG. 11 illustrates the process of wireless network detection and the factors affecting detection according to one aspect of the present invention.

The orthogonal state necessary to initiate a scan is characterized as sufficient to scan, at 32 in FIG. 11. The component responsible for initiating the scan is the Scan Manager 36, as shown in FIG. 6. The orthogonal state can be embodied as an orthogonal state machine (e.g., a dynamic system calibrator intersects with connection, selection, and detection together forming an orthogonal state machine) which can be self-acting or enhanced by an interpolated cyber-foraging network system configuration set. In one embodiment of the invention, orthogonal state parameters considered during a determination of wireless network scan initiation by the CFCA includes, but are not limited to:

TABLE 4

STATE PARAMETERS

The observed difference in geospatial position since the last wireless network scan, L.
The observed power level, P.
The derived value of the wireless network scan interval, S.
The connected/disconnected state of the machine.
The availability of the Wi-Fi radio itself, on or off
The velocity of connected signal degradation, V.
The density of known AP for any one particular location, D.

Each listed state parameter, L, P, V, D and S must be sufficient to scan, at 32 in FIG. 11, before a scan is initiated and can be calibrated by the Dynamic System Calibration, as shown in FIG. 7. One example demonstrates how the wireless network scan interval is identified and how calibration affects the result.

TABLE 5

WIRELESS NETWORK SCAN INTERVAL

S = the wireless network scan interval
dMax = the longest the system will wait for a scan
dMin = the least amount of time before the system will initiate the scan
OSV = the value from a singular control used to calibrate scan initiation (aggression setting)
S = (dMin − dMax)OSV Connected Signal Degradation Velocity The velocity of connected signal strength degradation is a critical factor in initiating a scan and an integral part of the system as a whole. If the signal strength drops too fast, the CFCA acquires a new candidate signal as soon as possible. When velocity reaches a preconfigured threshold, a factored threshold dependent on the aggression level (a value identified by the dynamic system calibrator), a scan event is triggered.

On the grounds of detecting signal degradation alone responding to fading signals in this manner places the degradation algorithm above standard connectivity algorithms—where signal degradation remains unaccounted for until too late, and potentially deep into a viable alternative signal range. Detecting the degradation event allows the CFCA to respond to real time mobility scenarios with a hard handoff. As the mobile device moves away from the connected access point and closer to a second viable signal, the CFCA is able to connect to a candidate signal before the signal has deteriorated too far to maintain a quality of service (QoS) sufficient for network activity. In one example, determining an optimal wireless access point can be based on QoS as well as a user preferred calibration. The optimal wireless access point can be based on a network preferred calibration or based on a specified calibration.

Signal degradation has the additional advantage of making it possible to detect if the mobile device is moving. This can be done using the set of detected access points maintained by the CFCA. In one example, a configured number of scan results for any one particular access point in range are maintained in local memory. The Sum of Squares can be applied to the set of scan observations belonging to each access point and compare their difference against the hysteresis, also configured. When the difference of the aggregate access point set in-memory exceeds the hysteresis, then a Location Changed event will be fired by the Scan Manager. In one example, the event can be processed by the Interpolated Data Set Retrieval Processes for consideration in Interpolated Data Set Retrieval. In another example, the event can be used by the Scan Manager itself to slow down the initiated Scan interval for power conservation.

Wireless Networking Context

Figure 13:
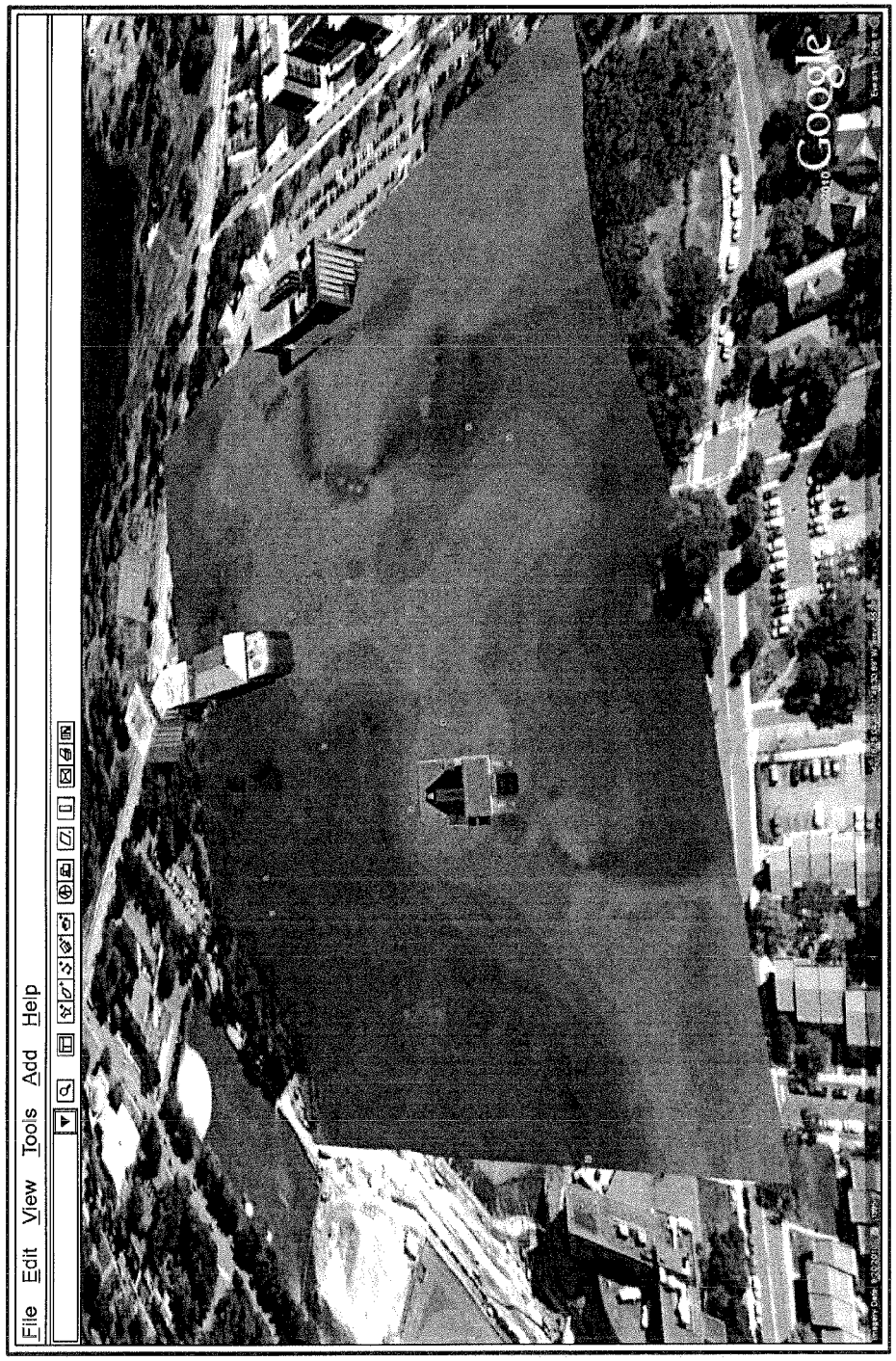
FIG. 13 is a wireless network context visualization over Google™ Earth according to one aspect of the present invention.

The Wireless Networking Context is used to maintain continuous connectivity by the CFCA and to produce visualizations of this context on the mobile device, as shown in FIG. 13. In particular, the CFCA includes a wireless networking context map generator that can present the wireless network context visualization shown in FIG. 13. In one example, the visualization is autonomous and is generated without the assistance of distributed systems. It is constructed by both the CFCA, as shown in FIG. 6, and the WNCS, as shown in FIG. 12. In one embodiment, aspects of the wireless networking context are the product of the wireless network detection process, as shown in FIG. 11. Other aspects are the product of interpolation by the WNCS, shown in FIG. 12, and interpolation processes embodied by the Signal Data Interpolator 8 and the Range and Function Interpolator 9 of the interpolation service 3. Together, these products embody a comprehensive collection of environmental observations, functions, ranges, and thresholds which includes, but is not limited to, information recorded and derived by both the CFCA and the WNCS. As shown in FIG. 12, the interpolation service 3 (e.g., networking context interpolation module) can provide policy interpolation and configuration information to a policy controller of the wireless network policy service (functioning as a control plane).

Examples of metrics describing FIG. 13 of available detected and connected wireless networks and wireless characteristics of the mobile device include, but are not limited to:

TABLE 6

CHARACTERISTICS OF AVAILABLE WIRELESS NETWORKS

| wireless network attributes | Mobile device | Geospatial Attributes |
| --- | --- | --- |
| BSSID | MAC Address | Location |
| SSID | Connected Mobile Device | Velocity |
| Channel | IP Address | Accuracy |
| Signal strength | upload speed | Heading |
| Captive portal | download speed | Provider |
| Location | | |
| Security attributes | | |

Wireless Networking Context Construction
Beginning with the Mobile Device

Figure 14:
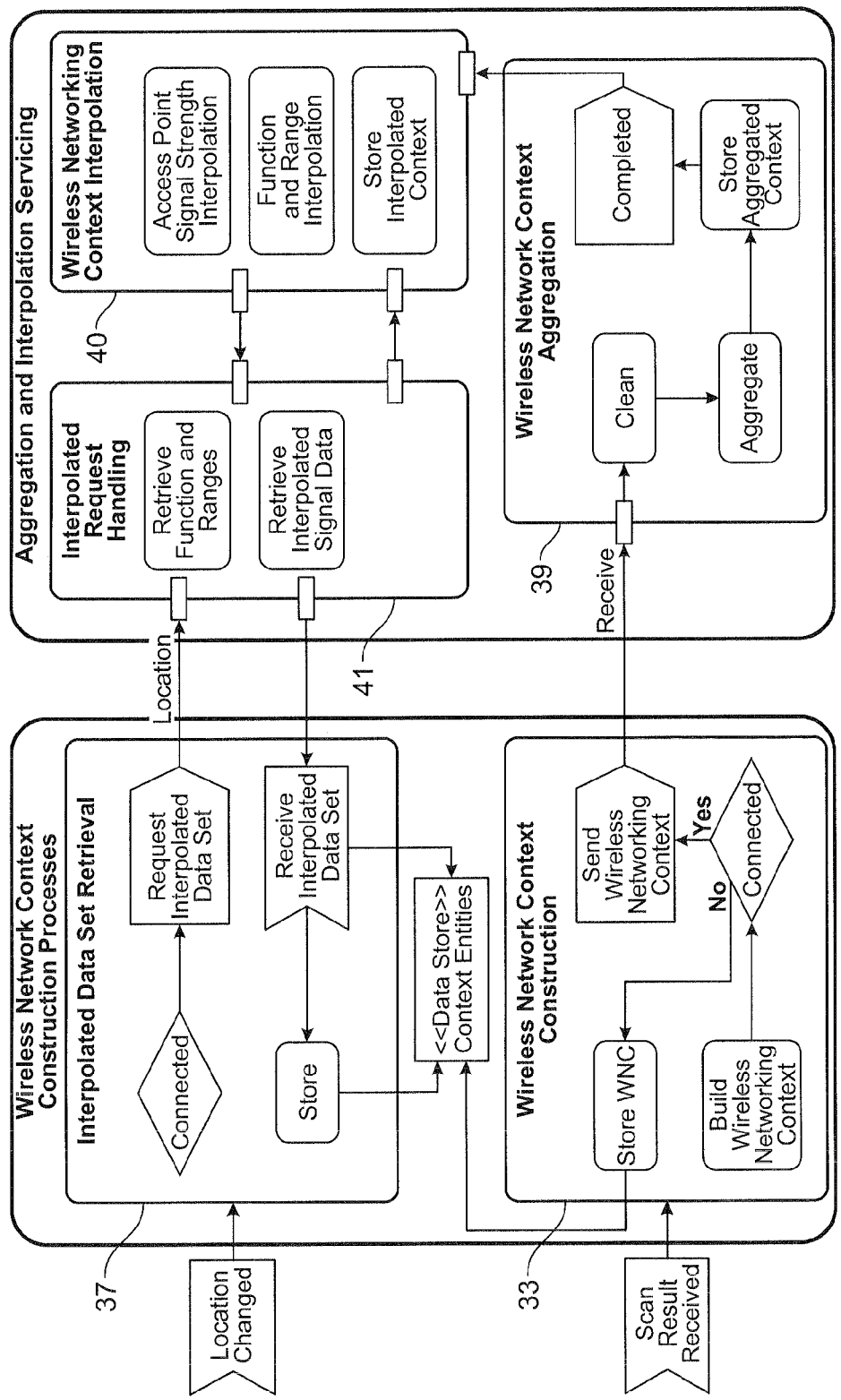
FIG. 14 illustrates wireless network context construction processes in communication with aggregation and interpolation servicing according to one aspect of the present invention.

The process of constructing the wireless networking context originates on the CFCA, at 33 in FIG. 14, and is embodied by the wireless networking context constructor (WNCC) 17 in FIG. 6. The WNCC is responsible for collecting the set of environmental observations or data from various sensors installed on the mobile device. Once constructed, the WNCC stores the data set and submits a copy of the data to the WNCS, shown in FIG. 12, via the Aggregation Service 1, for enhancement, a process exemplified by FIG. 14 at the wireless network context construction 33, and at the wireless network context aggregation 39. The process of the wireless networking context includes updates to the set of functions, ranges, and thresholds utilized by the wireless network selection and connection processes through Interpolation Data Set Retrieval 37 in FIG. 14.

The enhanced data sets return to the WNCC from the WNCS via an asynchronous parallel workflow, ensuring a constant flow of updated information being both uploaded and downloaded to the system triggered by both scan results received and location changes. The workflow is exemplified by FIG. 14. It includes the process of construction of the context on the CFCA, at 33, when a scan result is received and uploading that context to wireless network context aggregation 39. It also includes the interactions with aggregation and interpolation processes on the WNCS: Interpolated Request Handling 41 and Wireless Networking Context Interpolation 40. Overall, this workflow is a critical aspect of the cyber-foraging network system in keeping the CFCA calibrated to the location it is operating in at the time it is operating using the WNCS to offload processing the cyber-foraging network system configuration set required for optimal detection, selection, and connection to access points at the right time and place by the CFCA.

Aggregation

Figure 15:
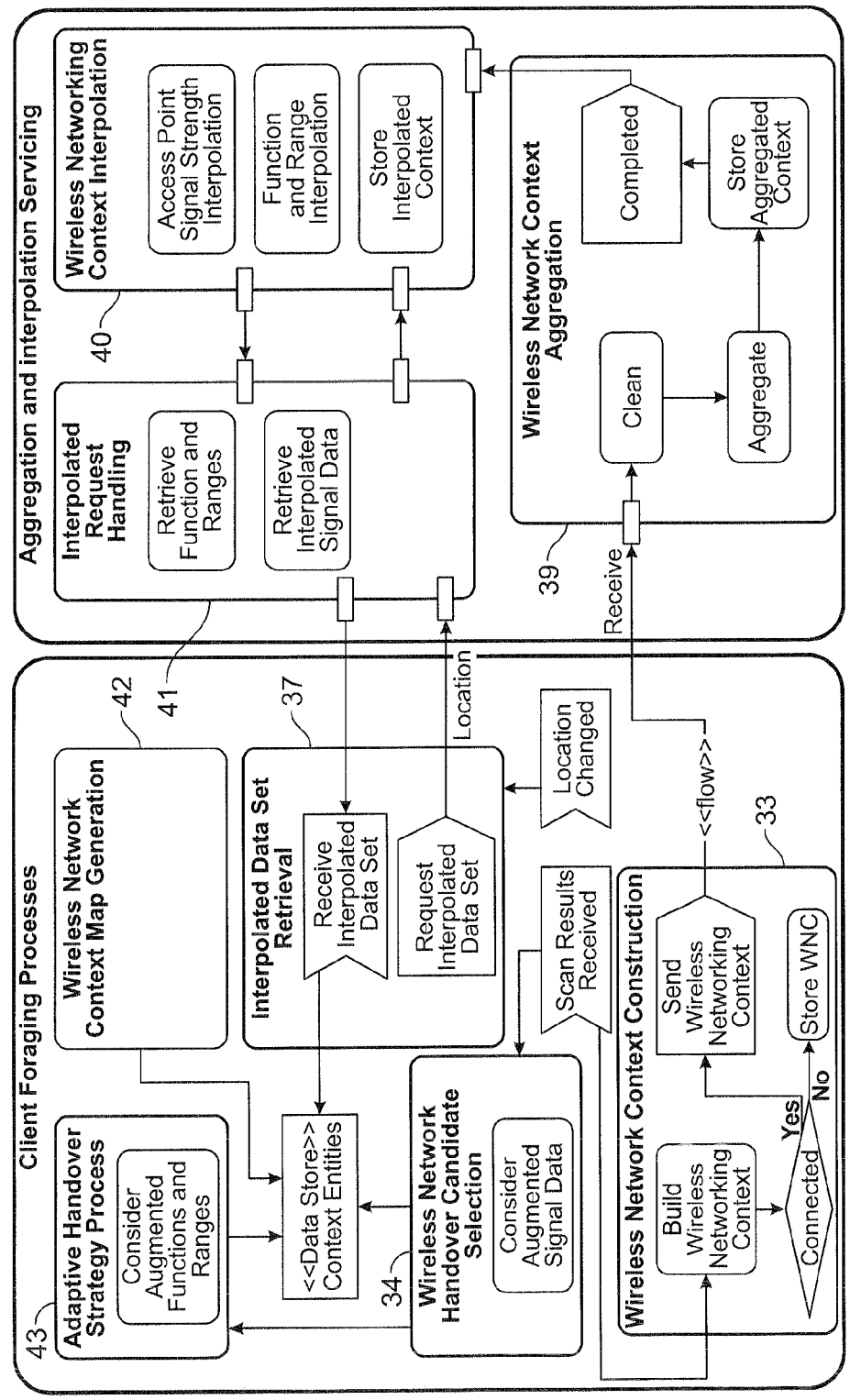
FIG. 15 illustrates a process of obtaining interpolated context from the wireless network context service according to one aspect of the present invention.

The WNCA is responsible for combining the constructed data sets submitted into a common body of information that represent the collective environmental observations for specific geospatial locations at specific dates and times. This technique is commonly referred to as Geo-Fencing. In one embodiment, the enhancement of the WNC by the WNCS, as shown in FIG. 12, is initiated by the WNCC, at 33 via the Wireless Networking Context Aggregator (WNCA) 39, as also illustrated in FIG. 15. In one embodiment, the enhancement of the WNC by the WNCS is initiated by the interpolated data set retrieval 37. Upon completion of the aggregation process, the WNCA publishes this updated information as a data set aggregation event.

Interpolation

Figure 16:
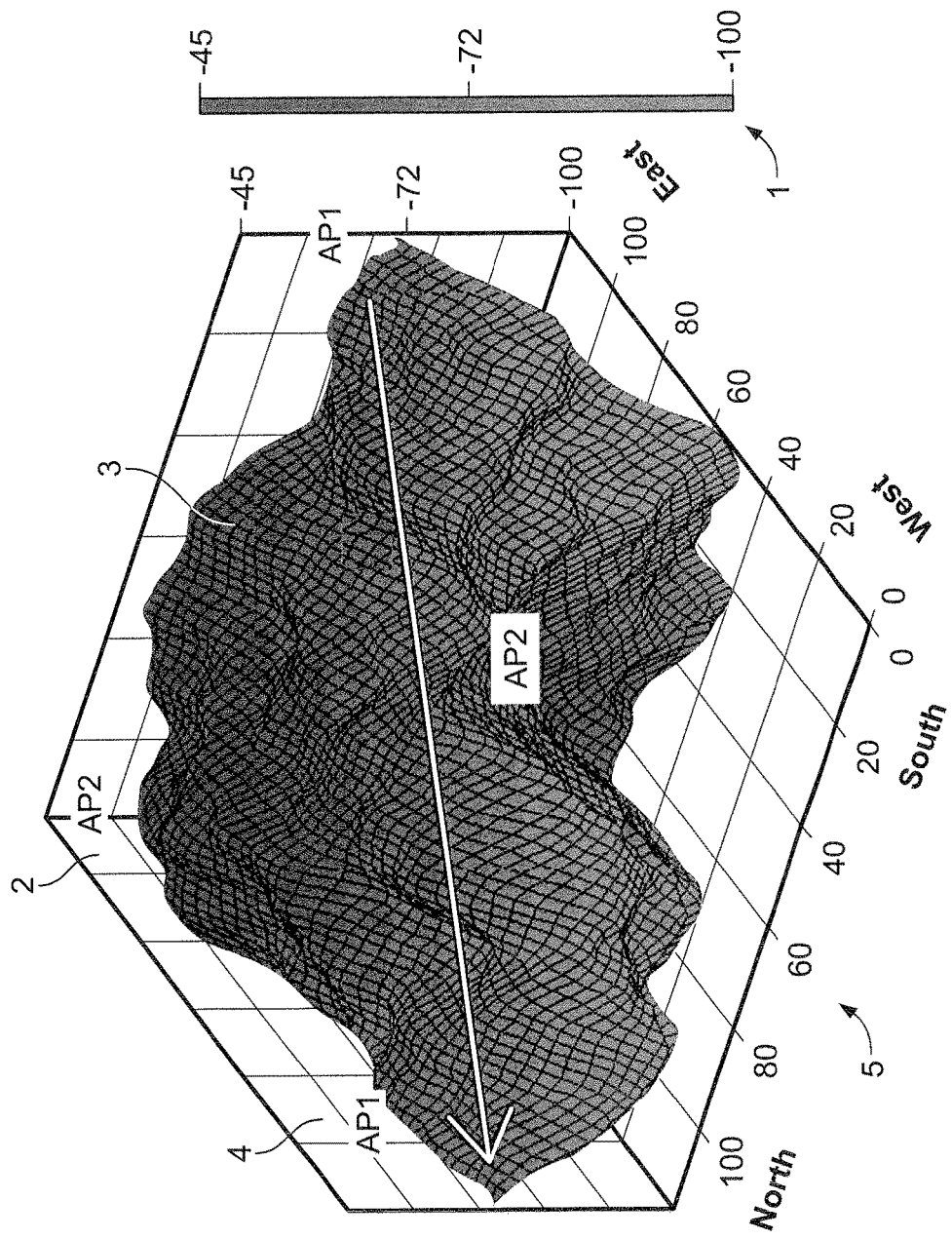
FIG. 16 is a prediction surface for obtaining the best wireless network handoff candidates along a path according to one aspect of the present invention.

In order to fulfill the directive of this system, to maintain the best continuous connectivity where available missing data points is accounted for even with the aggregated results, the system interpolates what the signal would be where there is no sample. This is a common geospatial statistical problem and the processes use geospatial statistical techniques to fill in the missing data with interpolation. The system relies on the geospatial surface map, as shown in FIG. 16, to not only present the wireless network context visually but to also use as a prediction surface to determine what access point is the best to connect to.

In one embodiment, the interpolation of absent wireless networking context data is initiated via observation of the completion of a data set aggregation event, as illustrated in FIG. 15 at 39. In one embodiment, the interpolation is initiated by a request for interpolated data set in the event that the location changed at 37. In either case, the aggregated wireless networking context data set is processed by the interpolation service 3 as embodied by FIG. 3.

Examples of the process of interpolation handled by the interpolation service 3 are demonstrated in FIG. 15. The process for interpolating wireless context, at 40, is decoupled from the process of handling the requests for interpolation, at 41, and from the processes of aggregation at 39.

The construction of an enhanced perspective of the surrounding wireless network environment—having a level of detail and resolution beyond the capabilities of the sensors of an individual mobile device—is a feature to this system.

Wireless Network Selection

The cyber-foraging network system is responsible for selecting an optimal wireless networking access point from the set of wireless networks in range of the mobile device upon which the CFCA is installed. This optimal wireless networking access point is identified as the wireless networking handoff candidate. In one example, interpolated data can be calibrated prior to selecting the optimal wireless networking access point.

Figure 17:
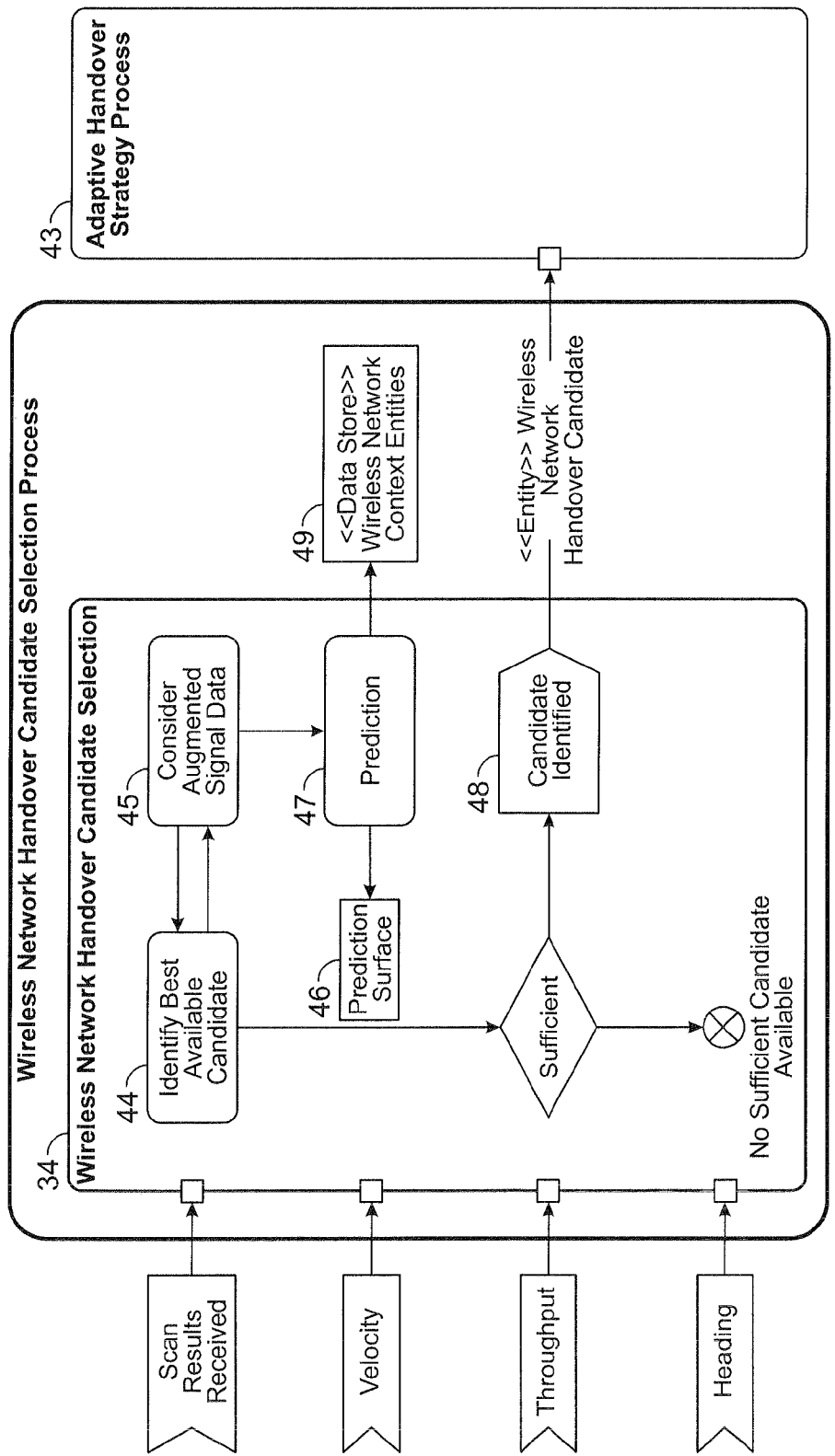
FIG. 17 illustrates a wireless network handoff candidate selection according to one aspect of the present invention.

The cyber-foraging client application (CFCA), as shown in FIG. 6, selects an optimal wireless networking access point candidate, as shown in FIG. 17 at 48, utilizing the wireless networking handoff candidate selection (WNHCS) process at 34. The CFCA takes into account native physical and temporal factors (e.g., historical factors) to determine the best candidate signal. When available, the wireless networking context service (WNCS), as shown in FIG. 12, provides additional context in the form of suggested candidates and interpolated data. The WNCS context is collected from aggregated Wi-Fi signal information and identified by the CFCA in its request for additional context from the location of the mobile device in a parallel process, as shown in FIG. 15 at 37. Requests for this additional context from the WNCS occur concurrently with handoff candidate selection.

The selection process is driven by handoffs scan-detected events, as shown in FIG. 17 at 34. The Wireless Networking Handoff Candidate Selection process, embodied by the network handoff candidate selector on the CFCA, as shown in FIG. 6 at 18, is initiated when a scan-detected event is received.

Once initiated, native physical and temporal factors are used to select the candidate signal from the set of available wireless access points. These factors include but are not limited to:

TABLE 7

FACTORS OF WIRELESS NETWORKING
HANDOFF CANDIDATE SELECTION

Heading
Geospatial velocity
Security protocols
Channel crowding
Relative signal strength TABLE 7-continued

FACTORS OF WIRELESS NETWORKING
HANDOFF CANDIDATE SELECTION

Signal strength relative to averaging window
Velocity of relative signal strength, improving or decaying
Prediction
Suggestion
Preferred networks
Average range of an access point
Upload/download velocity Wireless Networking Handoff Candidate The wireless networking handoff candidate (WNHC) is the product of the wireless network selection process embodied by the WNHCS, as shown in FIG. 17 at 48. The candidate is presented to the adaptable handoff strategy processor (AHSP) for connection, at 43, Submission to the AHSP does not guarantee a connection.

Wireless Networking Handoff Candidate Selection

The process of selecting the wireless networking handoff candidate is embodied by the wireless networking handoff candidate selector (WNHCS). The WNHCS is responsible for identifying the optimal candidate, as shown in FIG. 17 at 44, from the field of wireless networks currently found within range.

There are a multitude of conditions to satisfy in the selection process. Some conditions are weighted more heavily than others. These conditions can be particular to one or many networks. Weighting conditions (e.g., QoS) to determine the WNC in the WNHCS is delegated to the policy control agent 60 (i.e., Cyber-Foraging Policy Agent (CFPA)). The cyber-foraging network system can include a control plane that is manifested on the policy control agent 60 shown in FIG. 6. In one example, the policy control agent 60 operates autonomously using default configurations. In another example, the policy control agent 60 is configured by the cyber-foraging network system configuration set (e.g., calibration set). The weighting allows the WNHCS to decide what factor to consider over another. For example, using the suggested candidate based on heading or prediction over the strongest signal with a less crowded channel. In another example, policy configuration can disregard velocity and upload/download speeds.

Heading, Prediction

The CFCA loads a wireless networking context via its wireless networking context (WNC) constructor—whenever connected, as shown in FIG. 15. The process of WNC construction is done in parallel to other processes; as demonstrated by that activity, the demand for context data occurs asynchronously.

The stored WNC, as shown in FIG. 17 at 49, are used by the CFCA to create a prediction surface 46 constructed in memory. For example, a prediction surface 46 can be constructed on the mobile device from the WNC constructor (e.g., radar system) giving the mobile device range beyond its own sensors. Uses of the prediction surface to select the optimal access point can vary. In one example, using this prediction surface 46, as well as the heading of the mobile device, the wireless network selector determines what wireless network access point is the best wireless networking handoff candidate. The prediction is performed by determining which access point is going to be available and of sufficient quality of service where the mobile device is headed. In another example, the learned path method can be used to select the optimal access point. This learned path method has distinct advantages in rounding corners where under normal circumstances the wireless device would not be able to detect the signal is better. Under circumstances created by this cyber-foraging network system example, the CFCA can predict that around the corner the signal is significantly better.

An example of the surface map loaded in memory is displayed in FIG. 16. Referring to this figure coordinate (0, −100) indicates a relatively strong signal for AP1. The heading, as indicated by 3, is to the North West. Using the prediction surface, the WNHCS is able to determine that holding onto AP1 is the best option, although along the heading at location (50, 50) AP2 might be stronger. The device uses the OSV obtained from the calibration process, as shown in FIG. 7, to determine how to weight the quality of the signal over the hard handoff option. Insofar as the handoff process combines both heading information from the mobile device and the shortest path algorithms using surface prediction and geospatial statistics—facilitating the frequent micro-handoffs—the handoff process is distinguishable from other technology.

Suggested Candidate

In one embodiment of network selection, the wireless networking context service (WNCS) preselects the WNHC and makes that selection available to the CFCA as a suggested candidate when the WNC is downloaded to the CFCA by interpolated data set retrieval, as shown in FIG. 15 at 37. These suggestions become a recommended path or preselected path for connectivity based on the CFCA location. Ultimately, the mobile device chooses which access point to connect to based upon what is in range, allowing for flexibility where an access point is taken offline.

Figure 2:
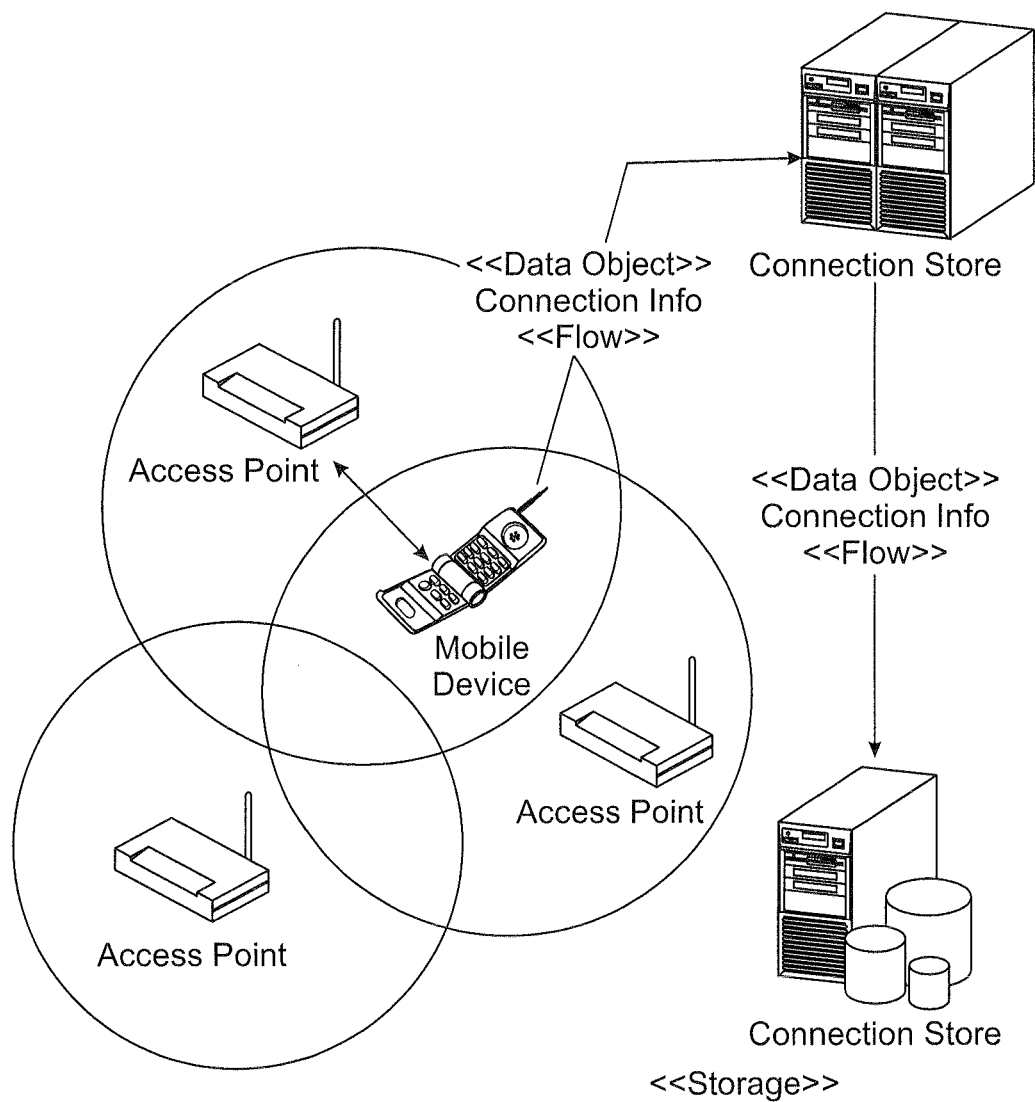
FIG. 2 is an interaction between the cyber-foraging client application and the wireless networking context aggregation service according to one aspect of the present invention.

One example of the preselected path is illustrated in FIG. 1 and FIG. 2 by the highlighted circles. Another example of such a path could be that identified in the prediction surface image in FIG. 16. The recommended path represents where the WNCS has predicted and/or learned where the CFCA is going. As long as the mobile device remains on the recommended path, the wireless network detection and wireless network selection processes play a lessor role as the WNC is somewhat predetermined. The primary benefit is in power conservation. Predetermined selections conserve resources on the mobile device that would otherwise be engaged in identifying a candidate. This reduces the power cost of initiating wireless network scans and/or determining the location of the mobile device.

Velocity and Relative Signal Strength Averaging Window

In regards to velocity, the WNHCS takes into account how large the averaging window should be. The averaging window is used in selection to smooth the signal data received by the CFCA over multiple scans in or around the same locations. It is widely recognized that fluctuations in signal strengths occur even if the mobile device does not move. The fluctuations are referred to as hysteresis of wireless signal strength. Switching networks in response to such fluctuations creates unnecessary handoffs, a phenomenon categorized in the wireless world as the Ping-Pong effect or oscillating handoff. Averaging the signal strength smoothes the resulting hysteresis reducing the probability of that phenomenon.

The size of the window to maintain signal readings plays a large role in the historical calculations required by the CFCA. One example of where the factor of the window size is important is using the Sum of Squares to indicate if the mobile device is moving in order to generate a location-changed event.

Another example of where the averaging window is critical is with determining the signal strength in the selection process with signal averaging. If the mobile device is moving quickly, the averaging window is reduced. If the mobile device is slowing, the averaging window is increased.

Another example of where the averaging window is critical is to the scan interval. If a scan occurs less frequently than the time it takes to traverse the range of the average router in that location, then having a window of any size greater than 1 does not make any sense.

All examples take into account the OSV. The following is an example of a calculation to determine the wireless scan interval as a factor of velocity in consideration of the OSV identified by the dynamic system calibrator 19 in FIG. 6.

TABLE 8

CALCULATING WIRELESS SCAN INTERVAL WITH VELOCITY

Derive the equation of the line
1. Identify the slope using the two known points ($OSV_{min}$, dMax) and ($OSV_{max}$, dMin) where $dMin = \frac{R}{V}$ using the following function $$m = \frac{dMin - dMax}{OSV_{min} - OSV_{max}}$$

2. Using the slope intercept as the equation to solve for S, y = mx + b
   a. b is known, dMax intersects Y at zero, b = dMax.
   b. x is known, x = OSV.

$$S = m * OSV + dMax$$

S = the wireless network scan interval, where S is greater than zero
dMax = the longest the system will wait for a scan
dMin = the least amount of time before the system will initiate the scan
OSV = the value from the dynamic system calibrator
V = the velocity of the mobile device
R = the average range of an AP in that location
$OSV_{min}$ = 0, the lowest OSV
$OSV_{max}$ = 1, the highest OSV
m = the slope between two points In one example to demonstrate the function of the above calculation, the mobile device is traveling at the rate of 3.6 ft per second, a moderate walking speed (2.5 miles an hour), then the walker can traverse the entire range of an access point in 42 seconds, which would then be the maximum time interval between scans. If the OSV setting is higher, and a scan is initiated every 20 seconds, then the walker has 2 scans before moving more than 150 feet. It follows then that the window holds both scans and must be the size of 2.

As a result, our window is calculated by dividing the average range of an AP in that location by the scan interval and round up.

$$W = \frac{R}{S},$$

where W is an integer.

Security

Figure 18:
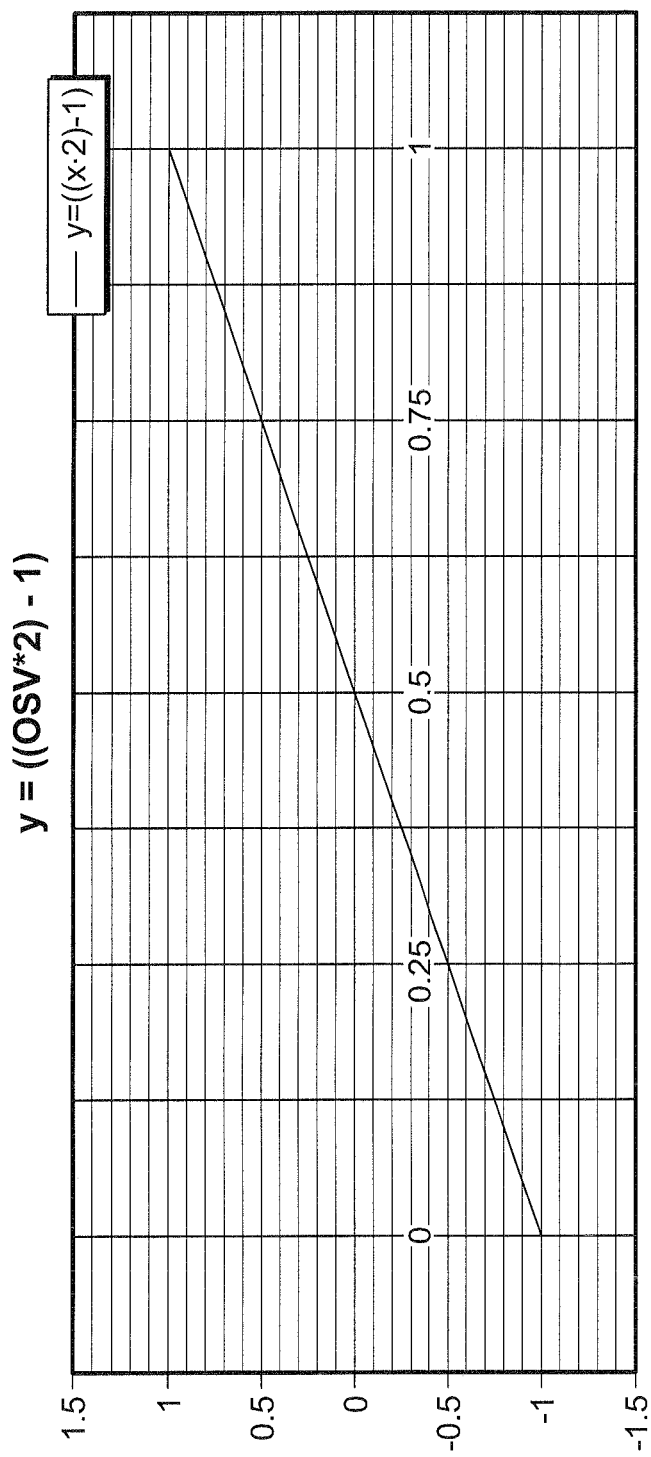
FIG. 18 illustrates a plot that is equivalent to a weighted function using one singular value obtained from a dynamic system calibration according to one aspect of the present invention.

The WNHCS 18, as shown in FIG. 6, weights secured networks over open networks by factoring in the OSV identified by the dynamic system calibrator 19. As was the case with prediction, security is weighted. FIG. 18 is an example of a weighting algorithm tied into the configuration service. The more conservative setting favors the configured networks over quality of signal; conversely, the more aggressive setting favors the best signal, regardless of the availability of secured networks. In most examples, policy on the mobile device can play a factor. Policy-on-device can be configured in a Wi-Fi Marketplace sub-system or separate system by the policy manager. The policy can override what networks are considered in regards to security.

Channel Crowding

Where all signal strengths are equal, the WNHCS takes the less crowded channel. An example of an aggressive position from the dynamic system calibrator 19, as shown in FIG. 6, can result in a crowded channel being selected where security is more of a concern.

Upload/Download Speed and Captive Portal

Once a candidate has been selected, the WNHCS begins a captive portal test; the WNHCS samples the upload and download speeds and stores them on the mobile device for upload to the WNC, at a later connection event. The WNHCS considers these speeds when comparing similar available networks as connection candidates. A faster upload and/or download speed edges out a comparable connection with the same signal strength.

Wireless Network Connection

When a wireless networking handoff candidate (WNHC) is identified as an event, as shown in FIG. 17 at 48, this is submitted to the Adaptable Handoff Strategy Processor 16, as shown in FIG. 6 to be used for wireless network connection. The Adaptable Handoff Strategy Processor 16 is an embodiment of wireless network connection and the adaptive handoff strategy process 43, as shown in FIG. 17. The adaptable handoff strategy incorporated within the process is used to determine if the WNHC is suitable for connection. The adaptable handoff strategy allows the handoff to become a connection at the wireless networking handoff point if it is determined that the qualities of the WNHC are sufficient to connect. In one example, a controller can be used to direct a mobile device (e.g., mobile wireless networking subsystem) to connect with an optimal wireless access point. In one example, the controller can determine the optimal wireless access point using interpolated data.

Adaptable Handoff Strategy Process

The wireless networking handoff point (WNHP) is identified as part of the adaptable handoff strategy (AHS) process. It is the optimal point in time and place when a WNHC 48 is considered sufficient for connection and particularly it is the point of time and place that the connection is initiated. The WNHP is the core in regards to QoS for mobile Wi-Fi Roaming scenarios. Most aspects of the system lead to this decision point. The WNHP extends the decision to connect beyond existing methods to connect to the most optimal network at the most optimal time and place to connect.

Wireless Network Connection 27, embodied by the AHS processor and exemplified by the AHS process is customizable by calibration, as shown in FIG. 7. Every condition used in evaluating the WNHC for sufficiency to connect is using calibration through the functions embedded locally on the CFCA as well as those functions interpolated by the WNCS, as shown in FIG. 12.

The adaptable handoff strategy is calibrated to location. A change in location triggers the download of interpolated WNC (e.g., interpolated data) by the WNCS when connected, as shown in FIG. 14 at 37. In one example, this data is in the form of functions downloaded from the wireless networking context service (WNCS) at 41. The functions are calibrated to the location by the interpolation processes on the WNCS. Each function downloaded from the WNCS takes the OSV generated by the dynamic system calibration, as shown in FIG. 7.

The following is a table itemizing the conditions for sufficiency to connect. Each of the thresholds, Y, T and h, are identified in FIG. 20.

TABLE 9

CONDITIONS FOR SUFFICIENCY TO CONNECT

Figure 19:
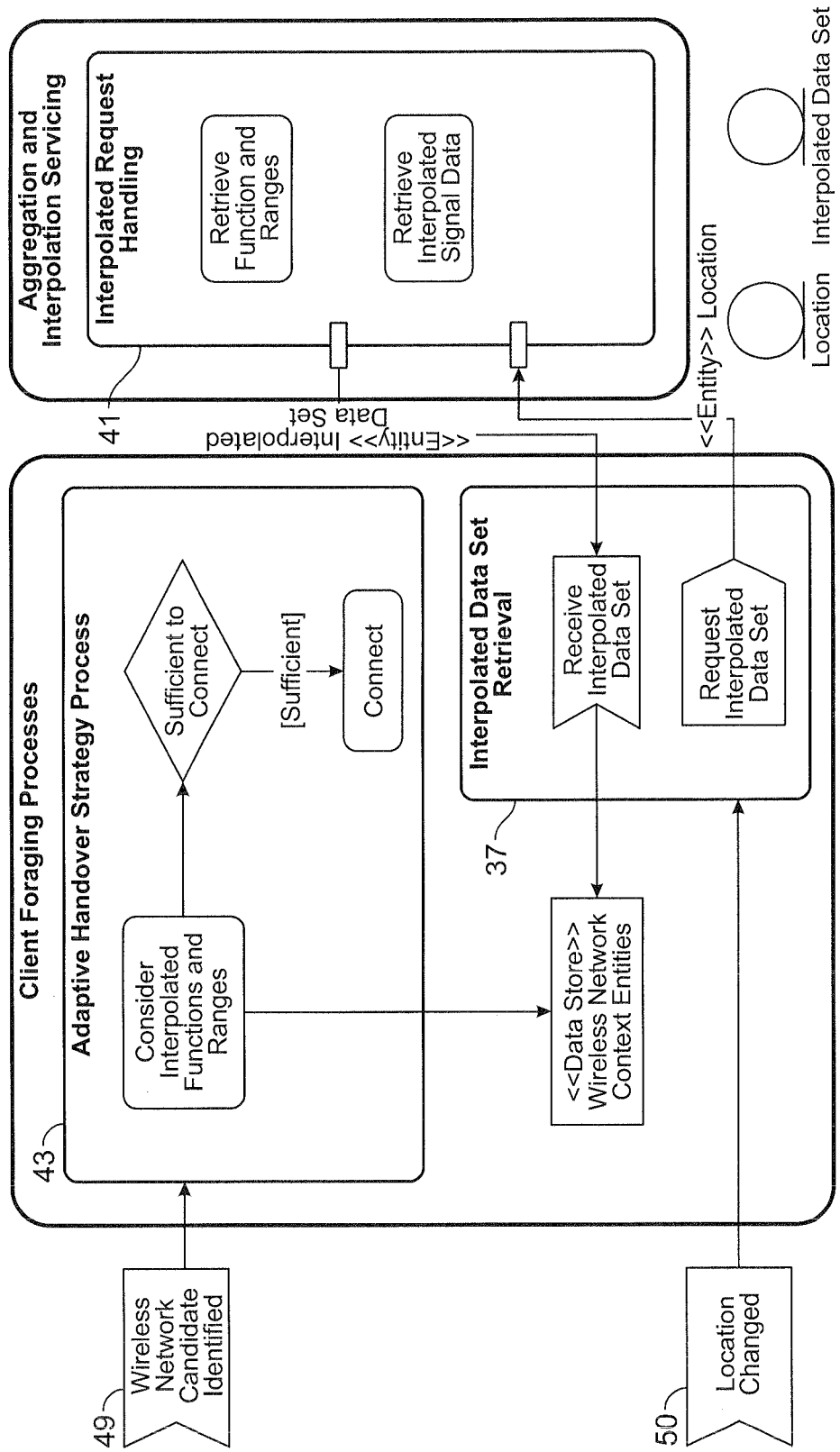
FIG. 19 illustrates details of the connection process according to one aspect of the present invention.

Y (candidate threshold), minimum allowable wireless network signal strength to be considered for handoff candidate selection
T, (connected signal threshold), the minimum allowable wireless network signal strength to allow before handoff candidate replacement (hard handoff)
h (hysteresis threshold), minimum allowable difference in signal strength between the currently connected wireless network and the wireless network handoff candidate
The range of T, Y and h
The function of T, Y and h
The velocity of connected signal degradation. V
Captive Portal
Available Captive Portal credentials Independent of the process of the AHS, when the CFCA is connected and has a location of sufficient quality, a request is sent to the WNCS for the interpolated data set, as shown in FIG. 19 at 37, which is used by the AHS to determine the WNHP. The WNCS continuously interpolates the ranges and functions from all sources of aggregated data (e.g., can represent historical environmental information data for a specific location) and provides the services that clients can consume for interpolated data. The WNCS is purely distributed and completely disassociated from any process engaged by the CFCA to detect, select, or connect.

Interpolated data set includes, but is not limited to, the following:

TABLE 10

INTERPOLATED CONNECTION DATA

Interpolated ranges of T, Y and h
Interpolated T, Y and h
Interpolated WNHC(s)
Interpolated functions of T, Y and h Adaptable Handoff Strategy Workflow The Adaptable Handoff Strategy Process 43, shown in FIG. 19, of the CFCA is a workflow that is triggered by a wireless networking handoff candidate (WNHC) event at 49. The AHS workflow determines if the attributes of the WNHC are sufficient for conditions to connect. The evaluation of these conditions takes place regardless of the connected state of the CFCA. The evaluation of these conditions may or may not result in a connection.

Calibration plays a large factor in the workflow in its effect on the products of functions used to identify the values to be considered for sufficiency to connect, as shown in FIG. 7 at 27. Calibration affects every condition in the AHS. Each function downloaded from the WNCS takes the OSV generated by the dynamic system calibration. The calibrated value (OSV), as shown in FIG. 7 at 28, identified by the dynamic system calibrator (DSC) 19, as shown in FIG. 6, is used as the variable x in the function $f(x)$—which determines what the value of T, Y and h are in the handoff strategies. One abstraction of this adaptability could be exemplified by:

TABLE 11

AN ABSTRACTION OF THE FUNCTION
DOWNLOADED FROM THE WNCS f (OSV) =
condition for suffiency to connect, where f
is the function dowloaded from the WNCS The functions associated with each of these critical values may themselves be interpolated functions that are unique to the location for which they were requested. Concurrently, the location of the mobile device is used by the CFCA to request the interpolated functions, as well as data from the WNCS, to be used in the AHS, as shown in FIG. 19 at 50. The use of the products of the Range and Function Interpolator 9, as shown in FIG. 12, of the WNCS makes the CFCA responsive in real time to its surroundings (i.e., specific locations).

When connected and the location quality is sufficient, the CFCA can request interpolated functions and ranges. Sufficiency of the quality of the location is another determination of the aggression setting, as shown in FIG. 7 at 24. If calibrated conservatively, the location quality would have to be very good before a request for interpolated connection data is made. If calibrated aggressively, the location quality could be marginal and whatever accuracy would be sufficient to pull down the interpolated connection data as long as the mobile device is connected.

Example of a Function

Each function's output is constrained by a range of values. For example, the range of T, the connected signal threshold, is normally the min and max signal that is measurable by a mobile device, for example from 0 dbm to 100 dbm. The aggregated data may show that the range of T is different for any one particular location, for example a lower bound of −82 dbm and an upper bound of −55 dbm. Accordingly, the function of T is modified by the WNCS Range and Function Interpolator 9, as shown in FIG. 12, to constrain the product of T to the appropriate ranges. In this example, the limit of the function to find T, $f(OSV)=T$, $f(OSV)$ has an upper bound of −55 dbm and a lower bound of −82 dbm for any OSV from 0 to 1. The OSV determined through the dynamic system calibration 21, as shown in FIG. 7, is applied to the function and the returned value does not exceed the range of signal strength that is identified by the embodiments of the processes in the Wireless Network Discovery. Alternatively, in the same example, the OSV may be downloaded as the cyber-foraging network system configuration set from the WNCS.

In one embodiment, the product of a function has a median, a mode, and an average within its range. When the dynamic system calibrator 19, as shown in FIG. 6, is positioned in a conservative setting, exemplified by FIG. 9, the value of T reflects the lower bound of T. If the DSC 19 is set in a moderate position, the mode of data sampled from any one particular location is the output.

Figure 21:
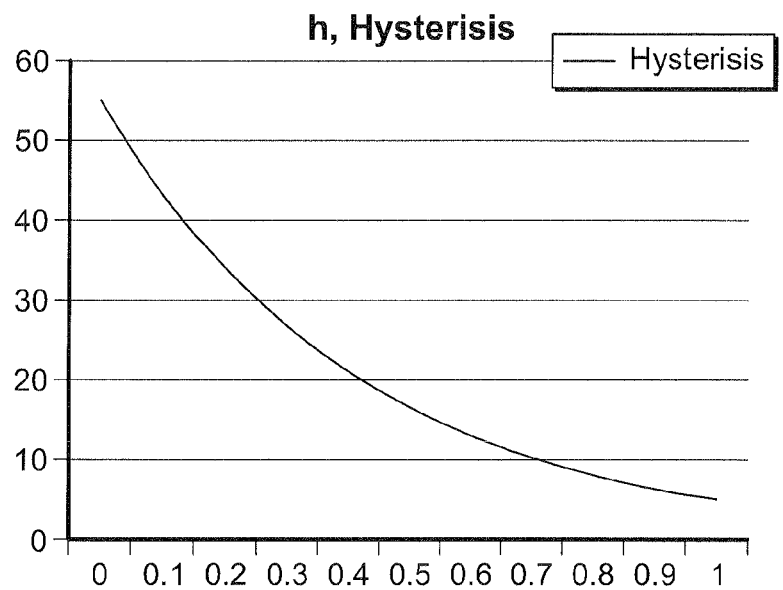
FIG. 21 illustrates a plot that is equivalent to a function demonstrating the means to calculate the hysteresis according to one aspect of the present invention.
Figure 22:
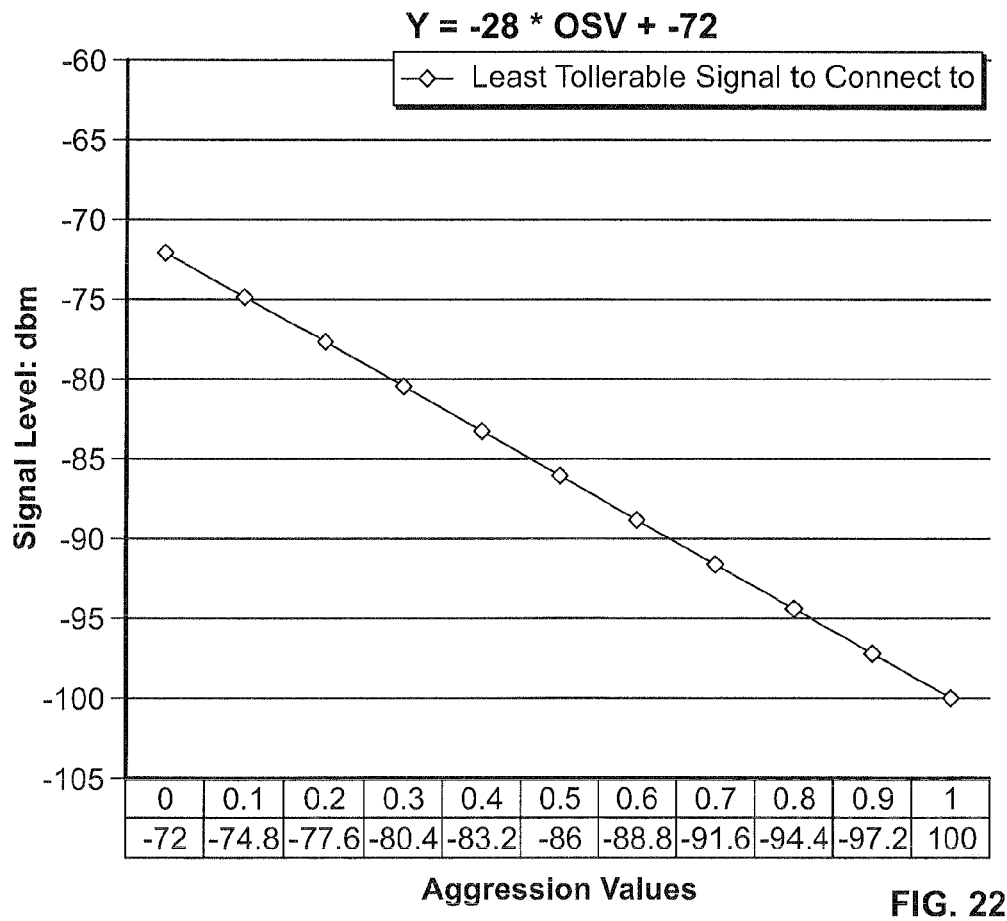
FIG. 22 illustrates a plot that is equivalent to a function for calculating the least tolerable signal to consider as a candidate for connection according to one aspect of the present invention.

The following example demonstrates how all functions are responsive to the aggression setting. The aggression setting is represented as the x-axis in FIG. 18, FIG. 21, FIG. 22, and FIG. 23. Referring to FIG. 22, the function of Y (the minimum allowable wireless network signal strength to be considered for handoff candidate selection), an aggressive position such as 0.9 results in a weaker candidate signal being considered for connection—in this case about −97.2 dbm. An aggressive position such as this can be used for wardriving (the act of searching for Wi-Fi wireless networks by a person in a moving vehicle, using a portable computer, smartphone or personal digital assistant (PDA)). However, wardriving might not be practical for walking. In another example, where fewer APs are encountered, the consumer ratchets down the aggression by dialing back, as shown in FIG. 10, the aggression setting to a more moderate setting where the AHS only considers a WNHC, as shown in FIG. 17 at 48, whose signal were to exceed −86 dbm. In another example, the WNCS provides the aggression setting (OSV) in the cyber-foraging network system configuration set.

Default Embedded Functions

As wireless networks do not cover the entire earth and are sometimes unavailable, the CFCA has to be able to carry out its function to maintain connectivity without the assistance of services. In that case, default functions are embedded in the CFCA, as shown in FIG. 6, of the mobile device making the CFCA fully autonomous.

In one example, the default functions are deduced in the following manner. A wide range of signal data is collected. In the case of Y, the mode of signal strength which resulted in tolerable connections is queried from the collected data. The OSV of 0.05 is considered the mean for the aggression setting. The mode of the data is used to reflect the mean of the aggression. Values from the connected data are then matched to a function; the function's ends are the extent of ranges within tolerable values for the behavior. FIG. 21 demonstrates that −100 dbm is the worst connection possible and −72 dbm is a preferred candidate for connection. Based on one example, −86 dbm was the mode for signal level. The signal strength of −86 dbm was the mode of the longest average connected duration. In one embodiment of the application of this data, the function intersects with the mode of available data as the mean aggression setting. In the example to determine Y, the function is: $Y=-28*OSV+-72$. This function is then hard coded as the default on the mobile device (e.g., cell phone).

Handoff Logic

The AHS workflow is triggered by scans which in turn are triggered by the change in location, as shown in FIG. 11, or some other event—as described in wireless network detection. The scan event initiates a WNHC event, as shown in FIG. 17 at 48, from the wireless network handoff candidate selection process 34, which triggers the AHS workflow 43. As the WNHC passes through the workflow, if the WHNC meets all the conditions for connection, the wireless networking handoff point (WNHP) is realized and a connection to the WNHC is initiated.

The AHS workflow begins the evaluation of the WNHC, based on the function $F_Y$ deduced by a standard range of $R_Y$ and uploaded to the CFCA by the wireless networking context constructor 17, as shown in FIG. 6, in the process of context construction in interpolated data set retrieval, as shown in FIG. 14 at 37. The OSV 28, as shown in FIG. 7 and identified by the dynamic system calibrator 19 in FIG. 6, is applied to the function $F_Y$ in order to identify the sought after threshold of the least tolerable signal to connect to, Y.

Disconnected

Figure 20:
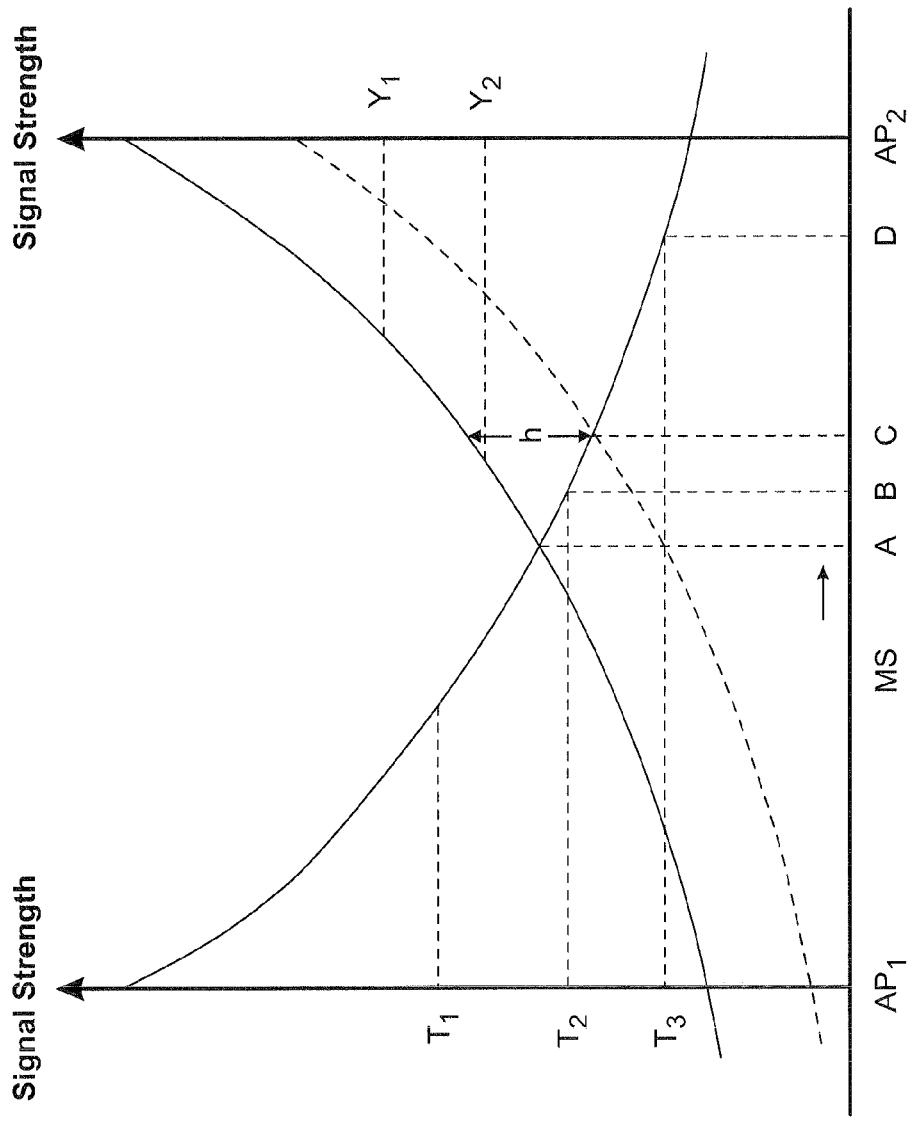
FIG. 20 is a graph of the dynamic handoff strategy according to one aspect of the present invention.

Referring to FIG. 20, in its disconnected state, a soft handoff is initiated without the assistance of the wireless networking context service (WNCS). The thresholds, h and T, are not considered as they are thresholds which are only applicable to hard handoffs in a connected state. The AHS workflow conducts the evaluation of the WNHC based on the default function $F_Y$ deduced by a standard range of $R_Y$ and hardcoded in the CFCA. The aggression value, as identified by the dynamic system calibrator, is applied to the function $F_Y$ in order to identify the sought after threshold of the least tolerable signal to connect to Y. If the WNHC is regarded as sufficient to connect, a connection is initiated at 43 in FIG. 19.

For example, if the signal strength of the candidate signal is −100 dbm, less than the threshold $Y_1$, then that candidate is ignored for connection. However, the threshold of $Y_2$ may be sufficient; the aggression setting could be 0.5 and the resulting value for $Y_2$ would be −86 dbm—at which point the process initiates the handoff to the WNHC being considered.

Connected State Handoff

Referring to FIG. 20, the fundamentals of the hard handoff workflow are explained in the connected state in the following way. The thresholds, h and T, are considered as they are thresholds which are applicable to hard handoffs. A mobile device is moving from access point $AP_1$ to $AP_2$. As the mobile device approaches $AP_2$, the signal of $AP_1$ fades and the signal strength of $AP_2$ increases. The first factor to consider in AHS is the WNHC, as shown in FIG. 19 at 49. This candidate signal is considered $AP_2$ in FIG. 20 and the threshold under consideration is Y. This threshold is calculated by running the OSV through the function $F_Y$ and the function of Y. If $AP_2$ is sufficient, the AHS considers the threshold of T, as calculated by the function of T, $F_T$, with the factor of OSV. If T is sufficient, then the threshold of h is considered, as calculated by the function of h, $F_h$, with a factor of OSV. If h is sufficient, then the WNHC is submitted for connection. The event of this connection determination is considered the wireless network handoff point.

Connected Strength

If connected, the AHS looks at the signal strength of $AP_1$ before considering dropping it. Before the AHS compares the connected signal to the candidate signal $AP_2$, the connected signal strength must be sufficient. If the connection is sufficient, the workflow stops and no connection is made. This threshold is identified as T.

Figure 23:
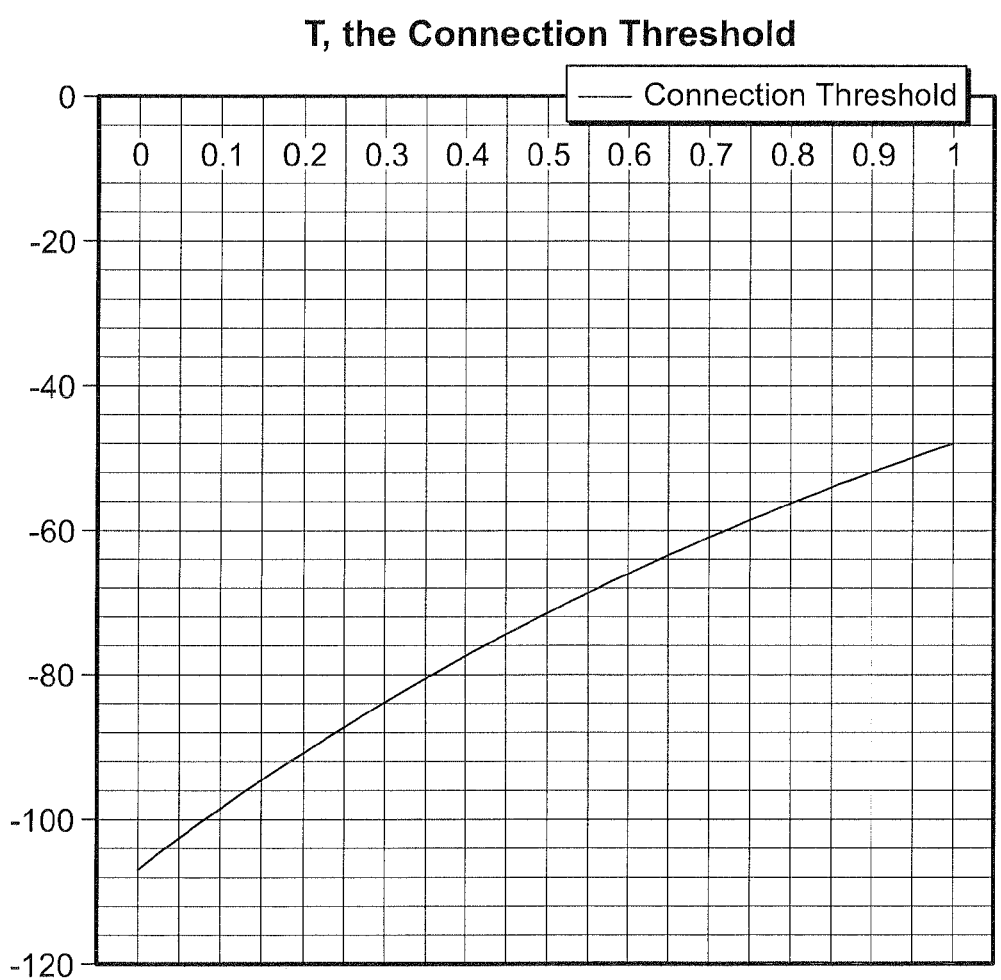
FIG. 23 illustrates a plot that is equivalent to a function for determining when to let a connected signal be replaced by a new candidate signal according to one aspect of the present invention.

The value of T is determined by the inputs of the aggression setting as well as the range of acceptable values for T, $R_T$ within a function $F_T$. An example of such a function is shown in FIG. 23; the example operates the same way as $F_Y$.

Connected Velocity

Also referring to FIG. 20, a positive velocity of connected signal from $AP_1$ (positive velocity of connected signal $AP_1$ is another way of saying that the signal of $AP_1$ is improving), indicates that the connection was improving and could potentially nullify any improvement that the candidate signal $AP_2$ might offer over $AP_1$. More aggressive settings favor the candidate signal $AP_2$. Accordingly, a weighted function, as shown in FIG. 18, is used to factor how much velocity affects the determination of the value of T according to the OSV.

Once AHS determines the sufficiency of the current connection for connection, the difference in signal strength between the WNHC and the current connection is identified for comparison to the hysteresis, h—an indicator of historical variance in signal. The candidate is considered for connection when the hysteresis has been exceeded. This threshold is identified as h. The value of h is determined by the inputs of the aggression setting and the range of acceptable values for h, $R_h$ within a function $F_h$. An example of such a function is shown in FIG. 21; the example operates the same way as $F_Y$.

Captive Portal

Captive Portal is a security mechanism for making Wi-Fi available on authentication. Authentication is forced by intercepting all packets, regardless of address or port, until the user opens a browser and indicates acceptance of the terms of usage. Until the acceptance of the terms is indicated, automatically connecting to Captive Portal results in no packets escaping the capture. Automatically connecting to Captive Portal, without authenticating, could result in the mobile device being unable to either send or receive data, without the consumer of the access point knowing why. The cyber-foraging network system improves on the standard manual authentication by first detecting Captive Portal and secondly storing the authentication sequence so that this sequence and/or credentials may be resubmitted automatically to the network without user interaction.

Figure 24:
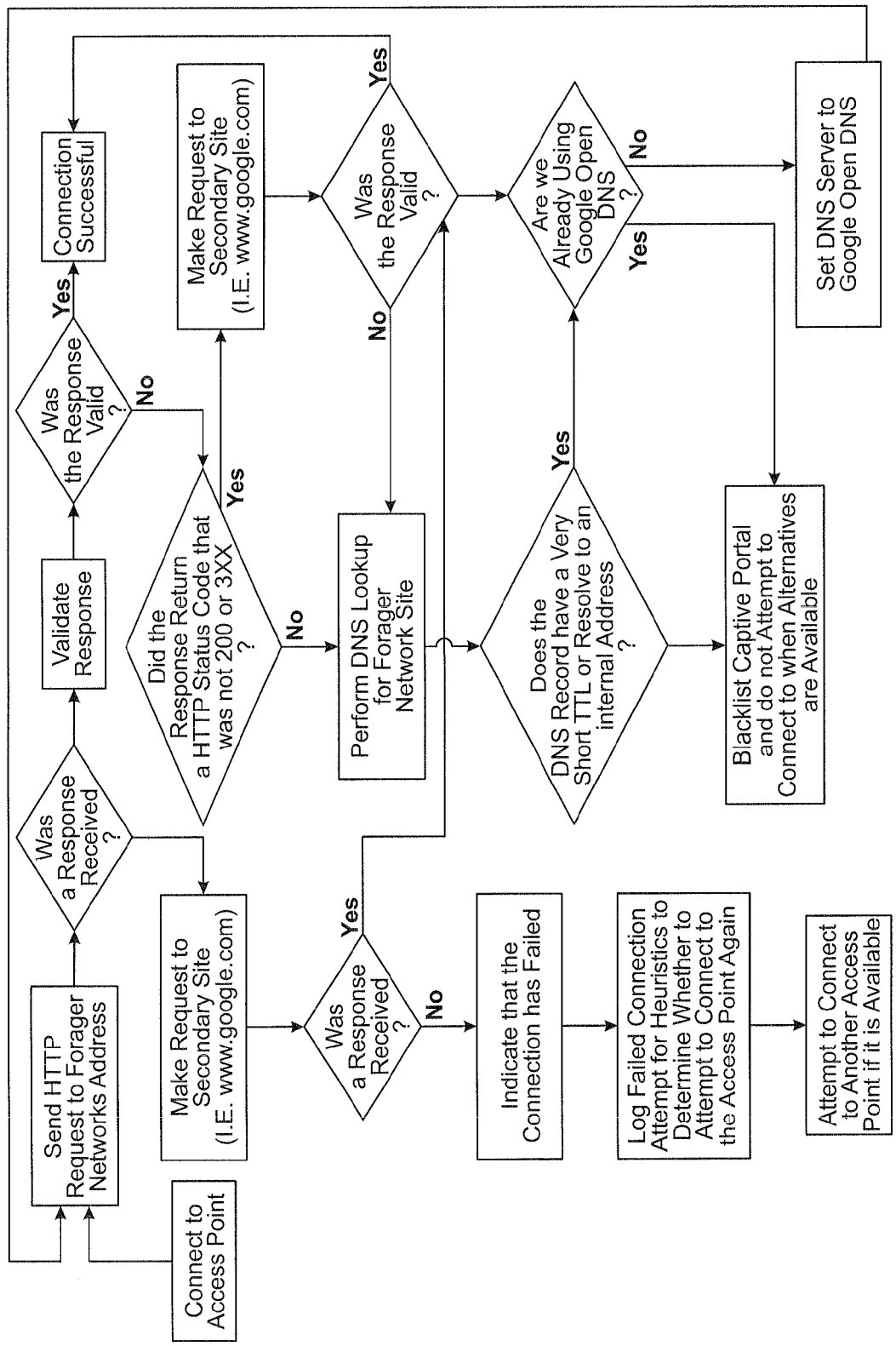
FIG. 24 is an illustration of a captive portal workflow according to one aspect of the present invention.

Captive Portal must be detected and avoided unless the CFCA (i.e., automaton) has the authentication credentials and can submit them for the consumer of the wireless network or has been configured otherwise to accept the connection. If it is detected and not configured, the connection is dropped. The CFCA Captive Portal workflow, as shown in FIG. 24, can allow the user to initiate the authentication process to unknown Captive Portal networks.

Identifying Captive Portal

CFNS procedures discover captive portals and upload the nature of the connection to the WNCS. This enables other devices to either evade or connect to these captive portals. In one example, a Captive Portal can be detected using a known web address that returns a 204 Http Status Code. If the 204 is not received and there is no connection error, the Captive Portal is assumed. In another example, captive portal credentials can be automatically submitted, allowing for a captive portal available Wi-Fi signal.

Capturing Authentication Posts

Repeatedly authenticating with a known captive portal breaks continuous connectivity—one of the goals of the Forager Wireless Networking System. The consumer can opt to capture their Captive Portal authentication post and store the captive portal locally on the mobile device. This enables automated re-authentication to the captive portal by the CFCA. For example, authentication is not shared but can be stored locally on the mobile device where the credentials were originally submitted allowing singular authentication and auto-submit for users with the credentials (in compliance with most laws in the US).

During the course of roaming on the Captive Portal subnet, the network may require re-authentication. In this case, the CFCA detects the condition and automatically posts the previously recorded credentials, enabling the best possible connectivity, without any user interaction.

The Captive Portal test is done on every network that is connected to the CFCA. The upload and download speeds are archived and sent to the WNCS along with all the other relevant Wireless Networking Context.

Wi-Fi Marketplace

Figure 25:
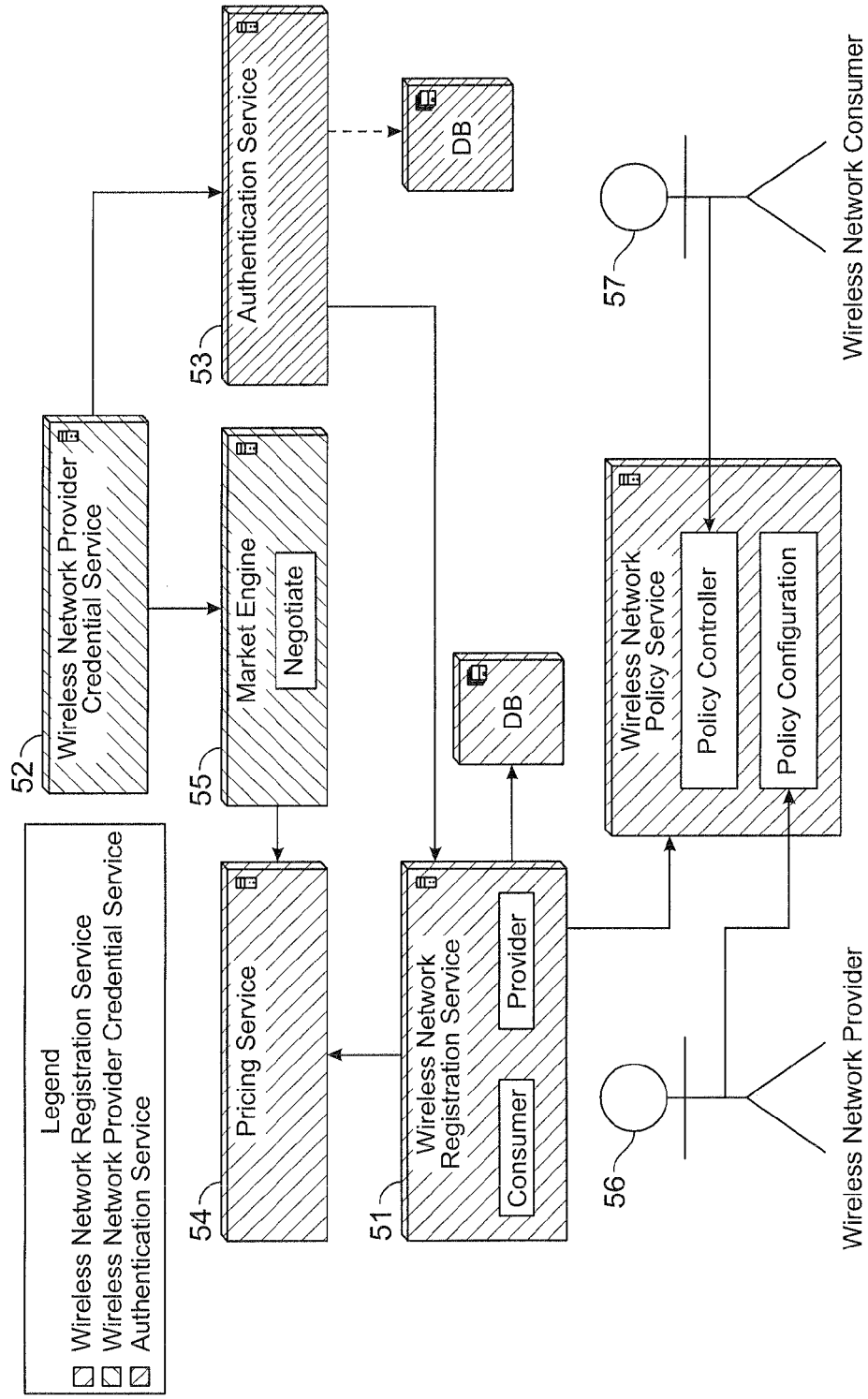
FIG. 25 is a marketplace deployment diagram according to one aspect of the present invention.

The Wi-Fi Marketplace (WFMP) is a subsystem of the cyber-foraging network system for registering networks for the secure and the automatic connection of cyber-foraging client applications (CFCA), as shown in FIG. 25. Alternatively, the WFMP can be a separate system. In one example, the WFMP can register wireless access points creating registered wireless access points that are configured to securely connect with a mobile device. The distributed services in this registration process are identified as the wireless network registration service (WNRS) 51, as shown in FIG. 25. The service that provides credentials to consumers for secure connection is identified as the wireless network provider credential service (WNPCS) 52. Networks that are registered with the WNRS are identified as wireless network providers 56, as shown in FIG. 25. The consumers or users of these credentials are identified as wireless network consumers 57. The service that provides policy configuration to the WNCS for the networks configured in the WFMP is the wireless network policy service (WNPS).

In one example, the WFMP, as shown in FIG. 25, can include a wireless network policy service (WNPS) (e.g., wireless network policy module), as described above, in communication and receiving information from the WNRS 51. The WNPS can use the policy controller to receive information from the wireless network consumers 57 (e.g., mobile wireless networking subsystem) and use a policy configuration to receive information from wireless network providers 56 (e.g., registered wireless access points). As described above, the policy controller can provide one or more functional aspects of a control plane. In this example, the policy controller provides these functional aspects with respect to a market place. In one example, the policy controller can have a control plane.

The market engine 55 provides the negotiation function between the WNPCS 52 and the pricing service 54. In particular, the market engine negotiates the spread between the bid price (e.g., from the wireless network consumer) and the asking price (e.g., from the wireless network provider). In one example, the pricing service 54 can handle the asking price information for the wireless network provider(s) which is negotiated by the market engine 55. In another example, the pricing service can itself have a dependency on an automated service, handling the asking price information, linked up through an application programming interface (API) which is run by the wireless network provider.

In one example, security is configured on a mobile device by entering security credentials on the mobile device. In other examples of securing a network, connection credentials can be submitted to a portal such as Captive Portal. In one example of securing a network Captive Portal, credentials can be registered to the WNRS. In another example, secure credentials can be configured in the WNRS.

Obtaining security credentials from previously unknown networks is no longer required with registered networks (i.e., registering wireless access points, which includes collecting the security credentials, creates registered wireless access points) in the WFMP for registered Wireless Network Consumers. In one example, mobile devices equipped with the CFCA can be sent the credentials for access to the network when within proximity of that same network.

The WFMP configures security by uploading network configurations (i.e., secured credentials for network authentication) from wireless access points to CFCA on request by location without any interaction required with the CFCA. These registered configurations are identified as wireless network provider credentials (WNPC) 61, as shown in FIG. 26.

Figure 26:
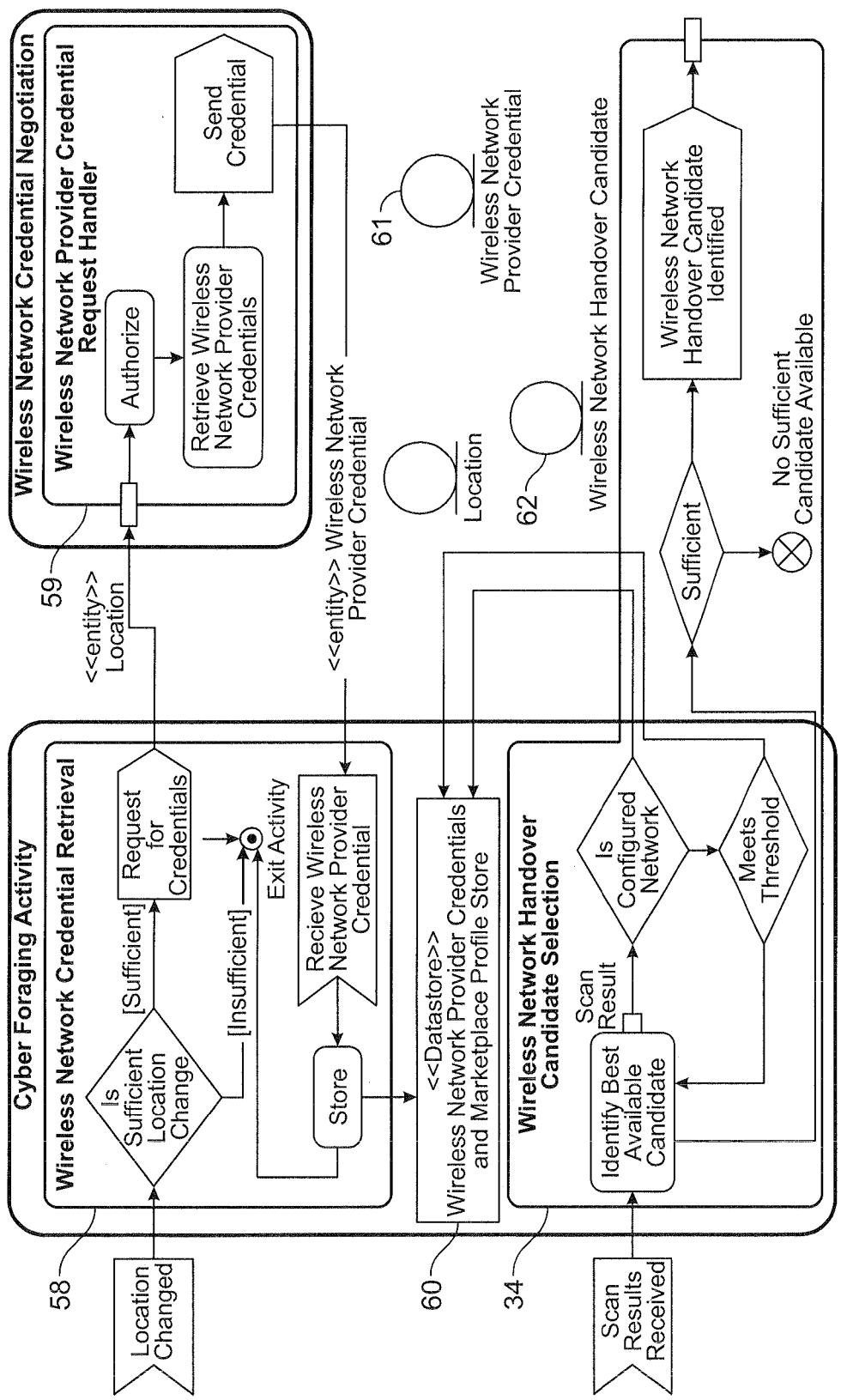
FIG. 26 is an illustration of the workflows used for marketplace interaction between services and the cyber-foraging client application (CFCA) according to one aspect of the present invention.

When connected, the CFCA downloads WNPC according to location from the WNPCS 52, an activity demonstrated in FIG. 26 as initiated by a chanced location event and identified as wireless network credential retrieval at 58. Once downloaded to the CFCA, the WNPC becomes an available network to the wireless network selection processes of the CFCA for consideration in wireless network handoff candidate selection 34 and subject to the conditions of the policy control agent 60 (i.e., cyber-foraging policy agent).

In one WFMP example, a marketplace is created by allowing wireless network providers of the wireless access points to choose what connection price they want to provide as their asking price (i.e., submitted by registered wireless access points) for connection to their secured network and allowing wireless network consumers of the mobile devices to provide a bid price (i.e., submitted by the mobile device and/or the mobile wireless networking subsystem) they are willing to pay, the WFMP negotiates the spread price (i.e., negotiated price). This connection asked by the wireless network provider is identified as the wireless provider connection threshold (WPCT). The connection bid by the wireless network consumer is identified as the wireless consumer connection threshold (WCCT).

The consumer (the CFCA user) of WNRC is allowed to set their own connection price (i.e., bid price) and define the max amount (or limit) they are willing to pay for the connection to wireless access points. In one example, the consumer can use a mobile device to select and connect to an optimal wireless access point based on maximum set amount or cost for wireless access points. This setting on the CFCA, called the wireless consumer connection threshold (WCCT), and the embodiment of this setting on the CFCA is identified as the wireless network marketplace profile.

A wireless network provider credential (WNPC) can include, but is not limited to, the following attributes:

TABLE 12

| ATTRIBUTES OF WNPC |
| --- |
| geospatial location |
| access code |
| security definition |
| wireless provider connection threshold |
| auto-adjusted price |
| policy configuration |

A wireless network marketplace or consumer profile can include, but is not limited to, the following attributes:

TABLE 13

| ATTRIBUTES OF MARKETPLACE PROFILE |
| --- |
| wireless networking consumer connection threshold |
| auto-pay on/off |

By aligning these sets of information during the process of wireless network selection, the wireless networking system is able to expand the set of available wireless networks on client-by-client basis, allowing each consumer to determine and adjust their own cost threshold for obtaining access to closed/secure networks as needed.

The negotiation of the spread on the producer side is conducted automatically by the WFMP in one example. In another example, the negotiating can be controlled through an application programming interface (API) allowing the wireless network provider an interface to control the negotiation with more granularities.

Effects on Wireless Network Selection

As demonstrated previously in FIG. 17, Wireless Network Selection is a process on the CFCA that is responsible for selecting the optimal wireless networking access point from the set of currently detected wireless networks available for connection to the mobile device. By including the market place in the workflow, as shown in FIG. 26, of obtaining a wireless network handoff candidate 62, the selection of secured networks is allowed from the aggregate network of registered providers. The effect is increased availability of wireless networks to the cyber-foraging processes of the CFCA without the requirement of any special hardware or interaction for authenticating credentials on a network registered to the cyber-foraging network system. By introducing bid price and asking price to the interchange, in one example, underutilized network capacity can be leveraged by anyone willing to pay some fraction of the cost for maintaining the network.

Security is always a factor in WNHCS. In a manually configured secured network on the mobile device, the policy control agent 60 (i.e., cyber-foraging policy agent) of the CFCA weighs the WNPC the same as any other secured network available for connection on the mobile device; the CFCA factors in the OSV identified by the dynamic system calibrator. In one example, the cyber-foraging policy agent can prohibit handoff to foreign networks as long as their networks are in range.

Other Aspects of the Wi-Fi Marketplace

- Reports missed transaction opportunities to wireless network providers.
- Associates anonymous connection and location data for anonymous profiling.
- In one example, allows guest connections without the risks of open unsecured networks or the annoyance of manual Captive Portal authentication.
- In one example, allows for automatic Captive Portal submission, retrofitting existing networks to the cyber-foraging network system without additional hardware or interaction with mobile device.
- Automatically adjusting the defined price to meet demand in real-time via a complex real-time market valuation engine at 55 in FIG. 25.
- Configurable cyber-foraging policy agent allows for calibration of CFCA behavior for each network.

Wireless Network Visualization

The WNC, defined in Table 6 Characteristics of Available Wireless Networks, is a collection of environmental observations that include, but are not limited to, information recorded by the cyber-foraging client application and interpolated by the wireless networking context service. The system visually presents the WNC of the mobile device to the consumer of the wireless signal. The WNC visualization gives that consumer a level of detail and resolution, beyond the capabilities of an individual mobile device's sensors by presenting a collective perspective of Wi-Fi signal. One embodiment of WNC is the Wi-Fi cloud or Wi-Fi heatmap as shown in FIG. 13.

Figure 27:
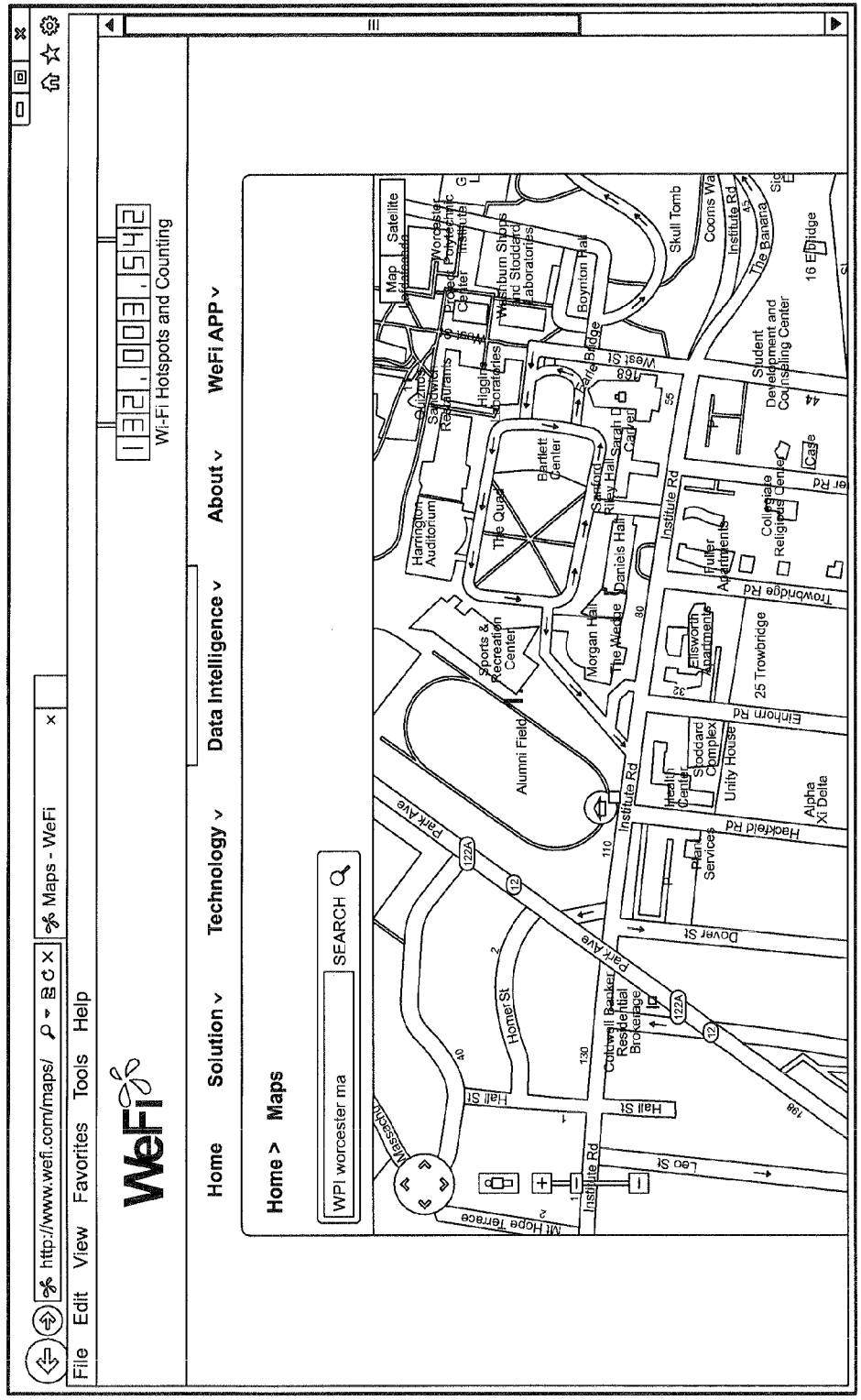
FIG. 27 illustrates pins on a map according to one aspect of the present invention.
Figure 28:
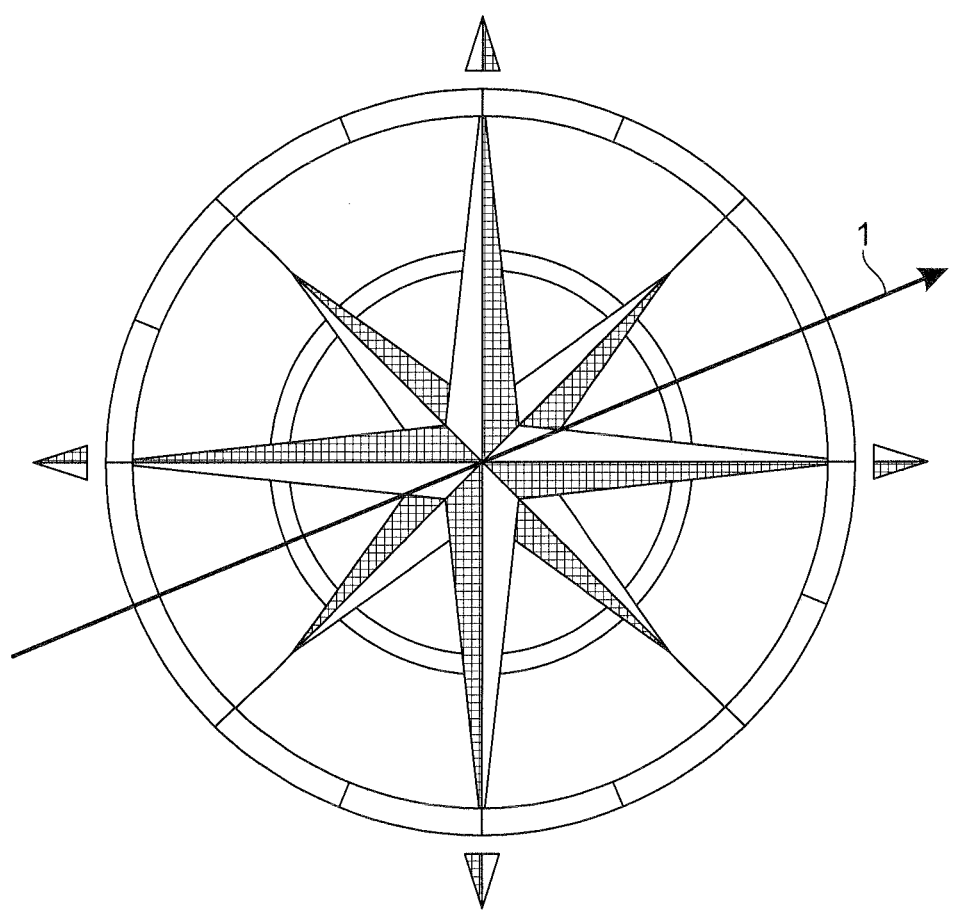
FIG. 28 is a Wi-Fi compass according to one aspect of the present invention.

The context available through wireless network visualization presents the consumer the signal strength at the location of where the signal was recorded or interpolated, rather than the location of the AP from which the signal comes from. The wireless network visualization presents the signal in any geospatial context, including street maps, satellite photos, etc. This is done to facilitate finding the best available signal, in order to achieve the level of quality service desired for mobile device activities. This is different from other technology where the location of the access point is sought and displayed as a pin on a map as shown in FIG. 27.

In one example embodiment, a consumer of wireless signal finds that the closest location to the access point is not necessarily the best location to consume that signal. For instance, the material of a wall between the consumer of the wireless signal and the AP can make an immense difference. For example, 25 feet away from the router, with a glass wall in between, can be better than 5 feet away from the router, with a brick wall in between. For example, in FIG. 13, consumers familiar with a college campus, such as WPI in Worcester, Mass., will recognize the deep purple as Wi-Fi shadow on steeply descending hills leading away from the quad.

There is no requirement in the details of the wireless networking system (WNS) to know the Wi-Fi signal's physical access point location. The system is concerned with where the signal is and what the quality of that signal is where it is found. This is the most important data point consumed by the system when trying to maintain continuous connection. The CFCA, as shown in FIG. 6, empowers the wireless consumer to identify where the signal is best, not where the signal is coming from. The WNS aggregates all the available wireless networks as one network and does not discriminate where the signal comes from or consider from what network it originated.

The following embodiments of WNC are, but are not limited to:

- Wireless Networking Context Map
- Wireless Networking Context Compass

Wireless Networking Context Map

The wireless networking context map (WNCM) is the product of the wireless network visualization process embodied by the cyber-foraging network system. The WNCM focuses geospatially located signal strength. The WNCM indicates both the signal location and the signal strength of all available Wi-Fi signals the mobile device detects; the WNCM does not emphasize the location of the access point that generates the signal. One example of such a map is demonstrated from data collected by the CFCA (i.e., automaton) in FIG. 13.

The wireless network context map is derived from the wireless networking context and is capable of presenting views of wireless networking metrics including, but not limited to:

TABLE 14

CONTEXT MAP PRESENTATION METRICS

The strength of the signal
The location the signal was measured
The interpolated values of signal where it was not measured
The wireless access points associated with the signal data
Information recorded and derived by both the cyber-foraging client application and the wireless networking context service Embodiments of the WNCM include any overlay of the WNC over any geospatial coordinate system with any geospatial characteristics. Geospatial characteristics which can be displayed, overlaid, and/or integrated with the WNC include but are not limited to, sea level, elevation, population density, temperature, political resources, natural resources, etc. These embodiments of the WNCM can include, but are not limited to, visualization, transportation, and/or machine memory. Examples include, but are not limited to:

- Heat map shown in FIG. 13.
- Heat map as surface map shown in FIG. 16.

Wireless Networking Context Compass

The wireless networking context compass (WNCC) is the product of the wireless network visualization process, embodied by the cyber-foraging network system. The WNCC leverages the existing prediction surface construct in memory, used in the wireless networking candidate selection process, from the WNC data. One embodiment of the WNCC is demonstrated in FIG. 28. Referring again to this figure, rather than pointing to magnetic north, the WNCC points to where the best signal can be found—in relative position to the mobile device. In one embodiment of the WNCC, the WNCC indicates how far away the usable signal is relative to the location of the CFCA.

Wireless Networking Context Map Generation

A process of generating the wireless networking context map is embodied by the wireless networking context map generator (WNCMG). The WNCMG is responsible for interpreting the data set comprising the wireless networking context, visually rendering this information to the consumer on the CFCA, as shown in FIG. 6, and also through the Map API of the wireless networking context service (WNCS). In one embodiment, the WNCM includes any number of network characteristics. For example, these characteristics would include but not be limited to upload download speeds, signal strength, the number of clients, and any aspect of wireless networking context otherwise known by one of skill in the art.

Embodiment of the WNCMG in the Cyber-Foraging Client Application

In one embodiment of the WNCMG, it is a component of the CFCA. FIG. 6 demonstrates the presence of the WNCMG on the mobile device, as it is deployed. FIG. 14 represents how two asynchronous events converge on the CFCA to create the WNCM. In one event, a change in location triggers the retrieval of interpolated data sets 37. The workflow continues, if connected, the CFCA sends a request with the mobile devices location to the interpolated request handler of the aggregation and interpolation service for interpolated signal data 41. In a second parallel and asynchronous event scan, results become available and the wireless network context constructor is notified at 33, if connected WNC is stored with other context entities in memory on the mobile device, if not connected WNC is uploaded to the Wireless Network Context Service for aggregation at 39.

When the consumer chooses to view the WNCM, the process dedicated to rendering the map reads the WNC stored in the Context Entities store on the CFCA, as shown in FIG. 15 at 42. The WNCMG generates a wireless networking context map (WNCM) from the Context Entities data store calculating a real-time visual representation of the WNC in the current physical location of the CFCA. The CFCA can display any aspect of the WNCM. In one example, the CFCA can display signal strength. In one example, the CFCA can display number of users. In one example, the CFCA could display upload download speeds.

Embodiments of the WNCMG in the Wireless Network Context Service

In other embodiments of the WNCMG, the WNCM is created by the wireless networking context service as shown in FIG. 12. The WNCMG process within the Interpolation Service 3, as shown in FIG. 3, is engaged any time and for any consumer interested in obtaining a WNCM.

In one embodiment of the WNCMG on the WNCS, the WNCMG is triggered on request for the WNCM based on a range of data identified by the location in the request for the map from either a CFCA or some other consuming service. The interpolated request manager 7, as shown in FIG. 3, makes a request to the Interpolation Service to generate a new WNCM for the location identified in the request. The WNCM can be stored in the Interpolated Data Store 4 as images, as shown in FIG. 3, and then respond to the request with the WNCM requested as images. In one embodiment, the WNCM can be stored and returned as a data set. The cyber-foraging network system does not restrict the media type that the WNCM can be stored as or delivered as.

In one embodiment of the WNCMG on the WNCS, the WNCMG is engaged on arrival of a newly aggregated wireless network context—from an event generated by the Aggregation Service 1 in FIG. 3. The WNCMG then pulls the newly aggregated data from the aggregated data store 2 in FIG. 3, interpolates the new interpolated signal data, stores that data in the interpolated data store, generates images from that interpolated signal data, and then stores those images in the interpolated data store to await request from the Interpolated Data API through the Interpolated Request Manager 7 in FIG. 3. WNCMG of the WNCM is not restricted to a request or a push from another system; any number of events or service calls can trigger WNCMG.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification, embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A network system, comprising:
   a plurality of wireless access points at a particular location or region;
   a mobile wireless networking subsystem device having a cyber-foraging client application (CFCA) configured to collect environmental information data from the particular location or region including from the wireless access points;
   a wireless networking context service (WNCS) subsystem in communication with the mobile wireless networking subsystem device, wherein the WNCS subsystem receives the environmental information data from the mobile wireless networking subsystem device;
   the WNCS subsystem having a networking context aggregation module and a networking context interpolation module, the modules being operable to provide aggregated data to determine an optimal wireless access point for continuous connection with the mobile wireless networking subsystem based on the environmental information data, the aggregated data including an enhanced data set of aggregated environmental information data residing outside a range of on-board sensors of the mobile wireless networking subsystem device;
   the CFCA utilizing the aggregated data to make decisions regarding wireless access point detection, selection, and connection, thereby extending the range of the on-board sensors; and
   a controller configured to direct the mobile wireless networking subsystem to handoff a connection from a current wireless access point to the optimal wireless access point prior to reaching a connected signal threshold of a connection to the current wireless access point.

2. The network system of claim 1, wherein the environmental information data comprises network utilization data.

3. The network system of claim 1, wherein the environmental information data comprises metrics derived through application of one or more processing algorithms.

4. The network system of claim 1, wherein the environmental information data comprises detection, selection, and connection together forming an orthogonal state machine.

5. The network system of claim 1, wherein determination of the optimal wireless access point is based on a quality of service (QoS) and a user preferred calibration.

6. The network system of claim 1, wherein determination of the optimal wireless access point is based on network preferred calibration.

7. The network system of claim 1, wherein determination of the optimal wireless access point further comprises native physical and temporal factors including at least one of heading, geospatial velocity, security, security credentials, channel crowding, signal strength, signal strength relative to averaging window, prediction, suggestion, preferred networks, and upload/download velocity.

8. The network system of claim 1, wherein the aggregation module combines the environmental information data to form the aggregated environmental information data.

9. A method of selecting an optimal wireless access point, comprising:
communicating with wireless access points at a particular location or region;
collecting environmental information data from the particular location or region including from the wireless access points;
aggregating the environmental information data from the wireless access points to produce aggregated data, wherein at least a portion of the aggregated data is data received from outside a range of on-board sensors of a connecting mobile device;
interpolating the aggregated data to produce interpolated data;
selecting, by the connecting mobile device, the optimal wireless access point based on the interpolated data; and
communicating with the optimal wireless access point, wherein the communicating comprises the connecting mobile device executing a handoff of a connection from a current wireless access point to connect with the optimal wireless access point prior to a threshold degradation of signal strength of a connection to the current wireless access point is reached.

10. The method of claim 9, further comprising a calibration of components for identifying the optimal access point with the interpolated data prior to selecting the optimal wireless access point.

11. The method of claim 9, wherein selecting the optimal wireless access point is based on a quality of service (QoS), enhanced interpolated data, and a specified calibration.

12. The method of claim 9, wherein selecting the optimal wireless access point further comprises native physical and temporal factors comprising heading, geospatial velocity, security, security credentials, channel crowding, signal strength, signal strength relative to averaging window, prediction, suggestion, preferred networks, and upload/download velocity.

13. The method of claim 9, further comprising weighting a quality of a signal from the wireless access points for selecting the optimal wireless access point.

14. The method of claim 9, wherein the environmental information data includes a cost of using each wireless access point.

15. The method of claim 14, further comprising selecting the optimal wireless access point based on a user's maximum set cost for the wireless access points.

16. A mobile device, comprising:
a cyber-foraging client application (CFCA) configured to collect environmental information data from wireless access points, wherein the CFCA sends the environmental information data to an external service for aggregation;
the CFCA receiving the aggregated data including at least an enhanced data set of aggregated environmental information data residing outside a range of on-board sensors of the mobile device and the environmental information data;
the CFA determining an optimal wireless access point based on the aggregated data; and
a controller for directing the mobile device to handoff a connection from a current wireless access point and to the optimal wireless access point prior to reaching a connected signal threshold to the current wireless access point.

17. The mobile device of claim 16, wherein the CFCA further comprises an adaptable handoff strategy processor configured to receive interpolated data from the external service for determining an adaptable handoff strategy, and wherein the adaptable handoff strategy processor considers a connected velocity and/or a connected strength based on the received interpolated data for determining the adaptable handoff strategy.

18. The mobile device of claim 16, wherein the CFCA further comprises a wireless networking context constructor.

19. The mobile device of claim 16, wherein the CFCA further comprises a network handoff candidate selector.

20. The mobile device of claim 19, wherein the network handoff candidate selector selects the optimal wireless access point based on the optimal wireless access point signal while considering native physical and temporal factors.

21. The mobile device of claim 20, wherein the native physical and temporal factors include heading, geospatial velocity, security, channel crowding, signal strength, signal strength relative to averaging window, prediction, suggestion, and upload/download velocity.

22. The mobile device of claim 19, wherein the network handoff candidate selector comprises a policy control agent configured for weighting factors for selecting the optimal wireless access point signal.

23. The mobile device of claim 16, wherein the CFCA further comprises a dynamic system calibrator configured to receive a cyber-foraging network system configuration set to optimize hand-off algorithms and conserve power.

24. The mobile device of claim 23, wherein the dynamic system calibrator intersects with connection, selection, and detection together forming an orthogonal state machine.

25. The mobile device of claim 16, wherein the CFCA further comprises a wireless networking context map generator for presenting wireless network context visualization.

26. The mobile device of claim 16, wherein the CFCA further comprises a scan manager.

* * * * *